US011481923B2

(12) United States Patent
Lin et al.

(10) Patent No.: US 11,481,923 B2
(45) Date of Patent: *Oct. 25, 2022

(54) RELOCALIZATION METHOD AND APPARATUS IN CAMERA POSE TRACKING PROCESS, DEVICE, AND STORAGE MEDIUM

(71) Applicant: Tencent Technology (Shenzhen) Company Limited, Shenzhen (CN)

(72) Inventors: Xiangkai Lin, Shenzhen (CN); Yonggen Ling, Shenzhen (CN); Linchao Bao, Shenzhen (CN); Wei Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 289 days.

This patent is subject to a terminal disclaimer.

(21) Appl. No.: 16/915,825

(22) Filed: Jun. 29, 2020

(65) Prior Publication Data
US 2020/0327695 A1    Oct. 15, 2020

Related U.S. Application Data

(63) Continuation of application No. PCT/CN2019/079768, filed on Mar. 26, 2019.

(30) Foreign Application Priority Data

Apr. 27, 2018    (CN) ........................ 201810393563.X

(51) Int. Cl.
*G06T 7/73*       (2017.01)
*G06F 16/901*    (2019.01)
*G06F 17/16*     (2006.01)

(52) U.S. Cl.
CPC ............ *G06T 7/74* (2017.01); *G06F 16/9027* (2019.01); *G06F 17/16* (2013.01)

(58) Field of Classification Search
CPC    G06T 7/74; G06T 7/246; G06T 7/579; G06T 7/73; G06T 2207/20016;
(Continued)

(56) References Cited

U.S. PATENT DOCUMENTS

2013/0182894 A1*   7/2013   Kim ........................ G06T 7/246
                                                                    382/103
2017/0109930 A1*   4/2017   Holzer .................... G06T 13/20

FOREIGN PATENT DOCUMENTS

CN    102118561 A    7/2011
CN    102435172 A    5/2012
(Continued)

OTHER PUBLICATIONS

Extended European Search Report, EP19792167.9, dated Jan. 7, 2022, 9 pgs.
(Continued)

*Primary Examiner* — Jennifer Mehmood
*Assistant Examiner* — Kim Thanh T Tran
(74) *Attorney, Agent, or Firm* — Morgan, Lewis & Bockius LLP

(57) ABSTRACT

This application discloses a repositioning method and apparatus in a camera pose tracking process, a device, and a storage medium, belonging to the field of augmented reality (AR). The method includes: obtaining a current image acquired after an $i^{th}$ anchor image in a plurality of anchor images; obtaining an initial feature point and an initial pose parameter in the first anchor image in the plurality of anchor images in a case that the current image satisfies a repositioning condition; performing feature point tracking on the current image relative to the first anchor image, to obtain a
(Continued)

plurality of matching feature point pairs; filtering the plurality of matching feature point pairs according to a constraint condition, to obtain a filtered matching feature point pair; calculating a pose change amount of a camera from the initial pose parameter to a target pose parameter according to the filtered matching feature point pair; and performing repositioning according to the initial pose parameter and the pose change amount to obtain the target pose parameter of the camera.

20 Claims, 10 Drawing Sheets

(58) Field of Classification Search
CPC ............ G06T 2207/30244; G06T 7/75; G06F 16/9027; G06F 17/16; G06V 10/757; G06V 20/20
USPC ......................................................... 382/103
See application file for complete search history.

(56) References Cited

FOREIGN PATENT DOCUMENTS

| | | | |
|---|---|---|---|
| CN | 104680516 A | | 6/2015 |
| CN | 105069809 A | | 11/2015 |
| CN | 105141912 A | | 12/2015 |
| CN | 106595601 A | | 4/2017 |
| CN | 106885574 A | | 6/2017 |
| CN | 106934827 A | | 7/2017 |
| CN | 107301661 A | | 10/2017 |
| CN | 107481265 A | | 12/2017 |
| JP | 2009048516 A | * | 3/2009 |
| KR | 20120038616 A | | 4/2012 |

OTHER PUBLICATIONS

Raúl Mur-Artal et al., "ORB-SLAM: A Versatile and Accurate Monocular SLAM System", IEEE Transactions on Robotics, IEEE Service Center, Piscataway, NJ, vol. 31, No. 5, Oct. 5, 2015, XP011670910, 17 pgs.

Vincent Lepetit et al., "EPnP: An Accurate O(n) Solution to the PnP Problem", International Journal of Computer Vision, Computer Vision Laboratory, Ecole Polytechnique Federate de Lausanne (EPFL), CH-1015 Lausanne, Switzerland, vol. 81, No. 2, Jul. 19, 2008, 12 pgs.

Tencent Technology, WO, PCT/CN2019/079768, dated Jun. 27, 2019, 4 pgs.

Tencent Technology, IPRP, PCT/CN2019/079768, dated Oct. 27, 2020, 5 pgs.

Tencent Technology, ISR, PCT/CN2019/079768, dated Jun. 27, 2019, 2 pgs.

Cao Heng, "Research of SLAM Algorithm Based on Monocular Vision", Huazhong University of Science and Technology, Wuhan, China, May 27, 2016, 63 pgs.

* cited by examiner

FIG. 7

```
┌─────────────────────────────────────────────────────────────────┐  501a
│ Record the initial pose parameter corresponding to the first anchor image │
└─────────────────────────────────────────────────────────────────┘
                               │
                               ▼
┌─────────────────────────────────────────────────────────────────┐  501b
│ Obtain n pyramid images with different scales corresponding to the first │
│         anchor image, n being an integer greater than 1          │
└─────────────────────────────────────────────────────────────────┘
                               │
                               ▼
┌─────────────────────────────────────────────────────────────────┐  501c
│ Extract an initial feature point from each pyramid image, and record two- │
│    dimensional coordinates of the initial feature point in a case that the │
│            pyramid image is scaled to the original size          │
└─────────────────────────────────────────────────────────────────┘
```

FIG. 8

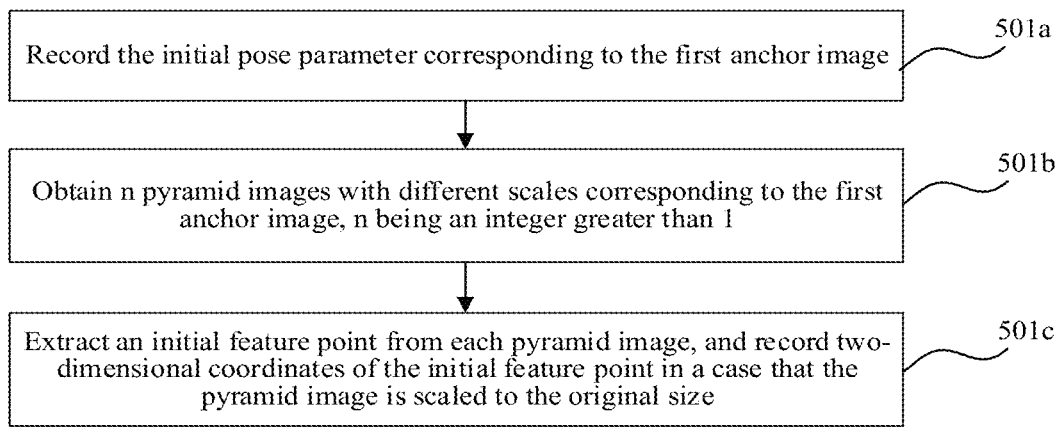

FIG. 9

RELOCALIZATION METHOD AND APPARATUS IN CAMERA POSE TRACKING PROCESS, DEVICE, AND STORAGE MEDIUM

CROSS REFERENCE TO RELATED APPLICATIONS

This application is a continuation application of PCT Patent Application No. PCT/CN2019/079768, entitled "METHOD, DEVICE AND APPARATUS FOR REPOSITIONING IN CAMERA ORIENTATION TRACKING PROCESS, AND STORAGE MEDIUM" filed on Mar. 26, 2019, which claims priority to Chinese Patent Application No. 201810393563.X, entitled "REPOSITIONING METHOD AND APPARATUS IN CAMERA POSE TRACKING PROCESS, DEVICE, AND STORAGE MEDIUM" filed Apr. 27, 2018, all of which are incorporated by reference in their entirety.

This application is related to U.S. application Ser. No. 16/915,798, entitled "RELOCALIZATION METHOD AND APPARATUS IN CAMERA POSE TRACKING PROCESS AND STORAGE MEDIUM" filed on Jun. 29, 2020, which is incorporated by reference in its entirety.

This application is related to U.S. application Ser. No. 16/900,634, entitled "REPOSITIONING METHOD AND APPARATUS IN CAMERA POSE TRACKING PROCESS AND STORAGE MEDIUM" filed on Jun. 12, 2020, which is incorporated by reference in its entirety.

FIELD OF THE TECHNOLOGY

Embodiments of this application relate to the field of augmented reality (AR), and in particular, to a repositioning method and apparatus in a camera pose tracking process, a device, and a storage medium.

BACKGROUND OF THE DISCLOSURE

Visual simultaneous localization and mapping (SLAM) is a technology in which a subject equipped with a camera establishes a model of an environment during movement without a priori information of the environment and at the same time estimates the movement thereof. The SLAM is applicable to the field of AR, the field of robots, and the field of autopilot.

Monocular vision SLAM is used as an example. The first frame of image acquired by a camera is usually used as an anchor image. In a case that the camera subsequently acquires a current image, a device tracks a common feature point between the current image and the anchor image, and performs calculation according to a position change of the feature point between the current image and the anchor image to obtain a pose change of the camera in the real world. However, in some scenarios, a feature point in the current image may be lost and can no longer be tracked. In this case, an SLAM repositioning method needs to be used to perform repositioning in the current image.

SUMMARY

Embodiments of this application provide a repositioning method and apparatus in a camera pose tracking process, a device, and a storage medium. The technical solutions are as follows:

According to an aspect of this application, a repositioning method in a camera pose tracking process is provided, applied to a device having a camera, the device being configured to sequentially perform camera pose tracking on a plurality of anchor images, the method including:

obtaining a current image acquired by the camera after an $i^{th}$ anchor image in the plurality of anchor images, i being greater than 1;

obtaining an initial feature point and an initial pose parameter in a first anchor image in the plurality of anchor images in a case that the current image satisfies a repositioning condition;

performing feature point tracking on the current image relative to the initial feature point in the first anchor image, to obtain a plurality of matching feature point pairs;

filtering the plurality of matching feature point pairs according to a constraint condition, to obtain a filtered matching feature point pair;

calculating a pose change amount of the camera from the initial pose parameter to a target pose parameter according to the filtered matching feature point pair; and performing repositioning according to the initial pose parameter and the pose change amount to obtain the target pose parameter of the camera.

According to another aspect of this application, a repositioning apparatus in a camera pose tracking process is provided, applied to a device having a camera, the device being configured to sequentially perform camera pose tracking on a plurality of anchor images, the apparatus including:

an image obtaining module, configured to obtain a current image acquired after an $i^{th}$ anchor image in the plurality of anchor images, i being greater than 1;

an information obtaining module, configured to obtain an initial feature point and an initial pose parameter in the first anchor image in the plurality of anchor images in a case that the current image satisfies a repositioning condition;

a feature point tracking module, configured to perform feature point tracking on the current image relative to the initial feature point in the first anchor image, to obtain a plurality of matching feature point pairs;

a feature point filtering module, configured to filter the plurality of matching feature point pairs according to a constraint condition, to obtain a filtered matching feature point pair;

a calculation module, configured to calculate a pose change amount of the camera from the initial pose parameter to a target pose parameter according to the filtered matching feature point pair; and a repositioning module, configured to perform repositioning according to the initial pose parameter and the pose change amount to obtain the target pose parameter of the camera.

According to another aspect of this application, an electronic device is provided, including a memory, a camera and a processor, the memory storing at least one instruction, the at least one instruction being loaded and executed by the processor to implement the foregoing repositioning method in a camera pose tracking process.

According to another aspect of this application, a computer-readable storage medium is provided, storing at least one instruction, the at least one instruction being loaded and executed by a processor to implement the foregoing repositioning method in a camera pose tracking process.

The beneficial effects produced by the technical solutions provided in the embodiments of this application at least include:

Repositioning is performed on a current image and the first anchor image in a case that the current image satisfies a repositioning condition, so that repositioning can be implemented in an anchor-SLAM algorithm for tracking a plurality of consecutive anchor images, and a tracking process is less prone to interruption. Because repositioning is performed on the current image relative to the first anchor image in a repositioning process, an accumulated error generated in a tracking process of a plurality of anchor images can further be eliminated, thereby resolving a problem that an SLAM repositioning method in the related art is not applicable to a mutated SLAM algorithm.

In addition, a plurality of matching feature point pairs are filtered according to a constraint condition to obtain a filtered matching feature point pair, and the filtered matching feature point pair is used to calculate a pose change amount. In one aspect, because feature point pairs that need to be calculated in a matching process are reduced, a matching speed is increased. In another aspect, because a feature point pair obtained through filtering is a feature point pair with better matching accuracy, matching precision can be improved.

BRIEF DESCRIPTION OF THE DRAWINGS

To describe the technical solutions in the embodiments of this application more clearly, the following briefly describes the accompanying drawings required for describing the embodiments. Apparently, the accompanying drawings in the following description show merely some embodiments of this application, and a person of ordinary skill in the art may still derive other drawings from these accompanying drawings without creative efforts.

FIG. 6 and FIG. 7 are schematic diagrams of an image in which a localization error occurs in an AR application scenario according to an exemplary embodiment of this application.

FIG. 8 is a flowchart of a repositioning method in a camera pose tracking process according to an exemplary embodiment of this application.

FIG. 9 is a schematic diagram of a pyramid image according to an exemplary embodiment of this application.

DESCRIPTION OF EMBODIMENTS

To make objectives, technical solutions, and advantages of this application clearer, the following further describes in detail implementations of this application with reference to the accompanying drawings.

Several nouns used in this application are briefly described first:

AR is a technology that as a camera acquires an image, a camera pose parameter of the camera in the real world (or referred to as the three-dimensional world or the actual world) is calculated in real time, and a virtual element is added according to the camera pose parameter to the image acquired by the camera. The virtual element includes, but is not limited to, an image, a video, and a three-dimensional model. The objective of the AR technology is to overlay the virtual world on a screen onto the real world to perform interaction. The camera pose parameter includes a rotation matrix and a displacement vector. The rotation matrix is used to represent a rotation angle of the camera in the real world. The displacement vector is used to represent a displacement distance of the camera in the real world.

Figure 1:
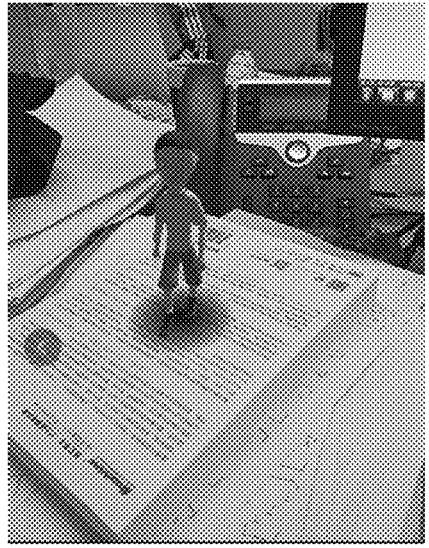
FIG. 1 is a schematic scenario diagram of an AR application scenario according to an exemplary embodiment of this application.
Figure 2:
FIG. 2 is a schematic scenario diagram of an AR application scenario according to an exemplary embodiment of this application.

For example, referring to FIG. 1 and FIG. 2, an electronic device adds a figure of a virtual human to an image photographed by the camera. As the camera moves in the real world, the image photographed by the camera changes, and a photographing position of the virtual human also changes, thereby simulating an effect that the virtual human is still in the image and the camera photographs the image and the virtual human while the position and pose are changing, so as to present a realistic three-dimensional picture to a user.

An anchor-switching AR system is an AR system that determines a camera pose parameter in a natural scene based on camera pose tracking of a plurality of consecutive anchor images and overlays the virtual world according to the camera pose parameter onto an image acquired by the camera.

An inertial measurement unit (IMU) is an apparatus configured to measure tri-axial attitude angles (or angular velocities) and accelerations of an object. Generally, the IMU includes three uniaxial accelerometers and three uniaxial gyroscopes. The accelerometer is configured to detect an acceleration signal of an object on each coordinate axis of a three-dimensional coordinate system, to calculate the displacement vector. The gyroscopes are configured to detect a rotation matrix of the object in the three-dimensional coordinate system. Optionally, the IMU includes a gyroscope, an accelerometer, and a geomagnetic sensor.

Schematically, a manner of establishing a three-dimensional coordinate system is as follows: 1. The X axis is defined by a vector product Y*Z, and a direction tangential to the ground at a current position of the device on the X axis points to the east. 2. A direction tangential to the ground at the current position of the device on the Y axis points to the north pole of the geomagnetic field. 3. The Z axis points to the sky and is perpendicular to the ground.

During camera pose tracking in the field of AR, for example, in a scenario of using a mobile phone to photograph a desktop to play an AR game, due to a special use scenario of AR, a fixed plane (for example, a desktop or a wall surface) in the real world is usually continuously photographed, the effect of directly using an SLAM repositioning method in the related art is relatively poor, and it is still necessary to provide a repositioning solution applicable to the field of AR.

Figure 3:
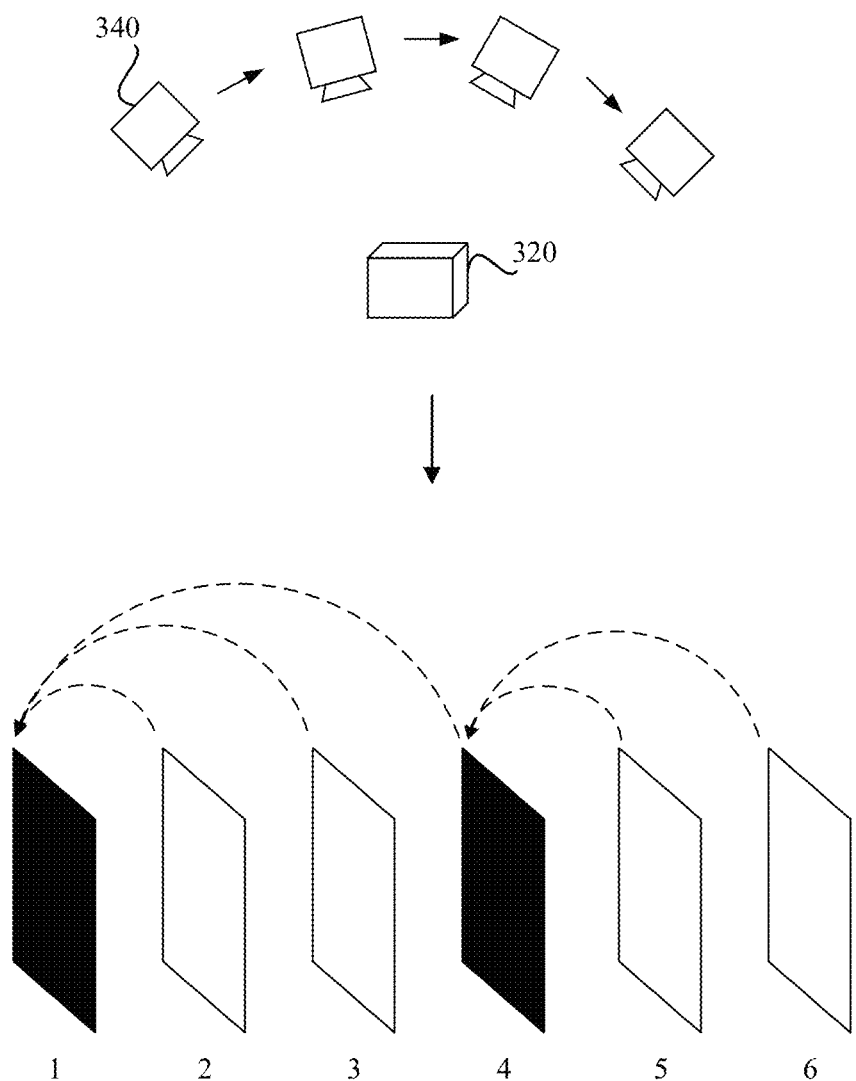
FIG. 3 is a schematic diagram of the principle of an anchor-switching AR system algorithm according to an exemplary embodiment of this application.

This application provides a repositioning method applicable to an anchor-switching AR system algorithm. In the anchor-switching AR system algorithm, in a process of determining a camera pose, a movement process of a camera is divided into at least two tracking processes to perform tracking, and each tracking process corresponds to a respective anchor image. Schematically, in a tracking process corresponding to an $i^{th}$ anchor image, in a case that a tracking effect of a current image relative to the $i^{th}$ anchor image is poorer than a preset condition (for example, a quantity of feature points that can be obtained through matching is less than a preset threshold), a previous image of the current image is determined as an $(i+1)^{th}$ anchor image, and an $(i+1)^{th}$ tracking process is started, i being a positive integer. Schematically, FIG. 3 is a schematic diagram of the principle of the anchor-switching AR system algorithm according to an exemplary embodiment of this application. An object 320 exists in the real world, a device 340 provided with a camera is held by a user to move, and a plurality of frames of image 1 to 6 including the object 320 are photographed during movement. The device determines the image 1 as the first anchor image (born-anchor or born-image) and records an initial pose parameter. The initial pose parameter may be acquired by an IMU. Feature point tracking is then performed on the image 2 relative to the image 1, and a pose parameter of the camera during the photographing of the image 2 is calculated according to the initial pose parameter and a feature point tracking result. Feature point tracking is performed on the image 3 relative to the image 1, and a pose parameter of the camera during the photographing of the image 3 is calculated according to the initial pose parameter and a feature point tracking result. Feature point tracking is performed on the image 4 relative to the image 1, and a pose parameter of the camera during the photographing of the image 4 is calculated according to the initial pose parameter and a feature point tracking result. Feature point tracking is then performed on the image 5 relative to the image 1. The image 4 is determined as the second anchor image in a case that the effect of feature point tracking is poorer than a preset condition (for example, there is a relatively small quantity of matching feature points). Feature point tracking is performed on the image 5 relative to the image 4, and a displacement change amount of the camera during the photographing of the image 4 and the photographing of the image 5 is calculated. A displacement change amount of the camera between the photographing of the image 4 and the photographing of the image 1 and the initial pose parameter are then combined to calculate a pose parameter of the camera during the photographing of the image 5. Feature point tracking is then performed on the image 6 relative to the image 4. The rest is deduced by analogy. A previous frame of image of the current image may be determined as a new anchor image in a case that the effect of feature point tracking of the current image deteriorates, and feature point tracking is performed again after switching to the new anchor image.

Optionally, an algorithm based on a visual odometry principle such as a feature point method or a direct method may be used for feature point tracking. However, in various abnormal scenarios such as that the camera moves relatively intensely, moves toward an intense light source, and moves toward a white wall in a tracking process, a loss phenomenon may occur in the foregoing tracking process of an anchor-switching AR system. The loss phenomenon means that sufficient feature points cannot be obtained from a current image through matching, resulting in a tracking failure.

Figure 4:
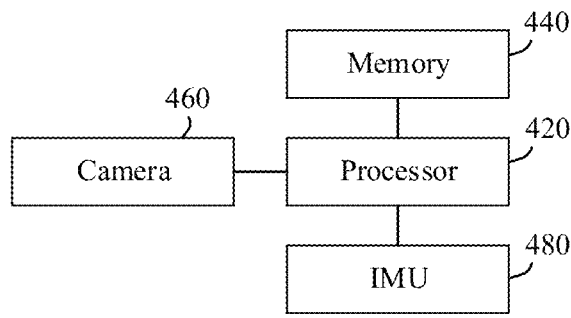
FIG. 4 is a structural block diagram of an electronic device according to an exemplary embodiment of this application.

FIG. 4 is a structural block diagram of a device according to an exemplary embodiment of this application. The device includes a processor 420, a memory 440, a camera 460, and an IMU 480.

The processor 420 includes one or more processing cores, for example, a 4-core processor, an 8-core processor, and the like. The processor 420 is configured to execute at least one of an instruction, a code, a code segment, and a program stored in the memory 440.

The processor 420 is electrically connected to the memory 440. Optionally, the processor 420 is connected to the memory 440 by a bus. The memory 440 stores one or more instructions, codes, code segments and/or programs. The instruction, code, code segment and/or program is executed by the processor 420 to implement an SLAM repositioning method provided in the following embodiments.

The processor 420 is further electrically connected to the camera 460. Optionally, the processor 420 is connected to the camera 460 by a bus. The camera 460 is a sensing device having an image acquisition capability. The camera 460 may also be referred to as a photosensitive device, among other names. The camera 460 has a capability of consecutively acquiring images or repeatedly acquiring images. Optionally, the camera 460 is disposed inside or outside the device. Optionally, the camera 460 is a monocular camera.

The processor 420 is further electrically connected to the IMU 480. Optionally, the IMU 480 is configured to: acquire a pose parameter of the camera at an interval of a predetermined time, and record a time stamp of each group of pose parameters during acquisition. The pose parameter of the camera includes a displacement vector and a rotation matrix. The rotation matrix acquired by the IMU 480 is relatively accurate, and the acquired displacement vector may have a relatively large error due to an actual environment.

Figure 5:
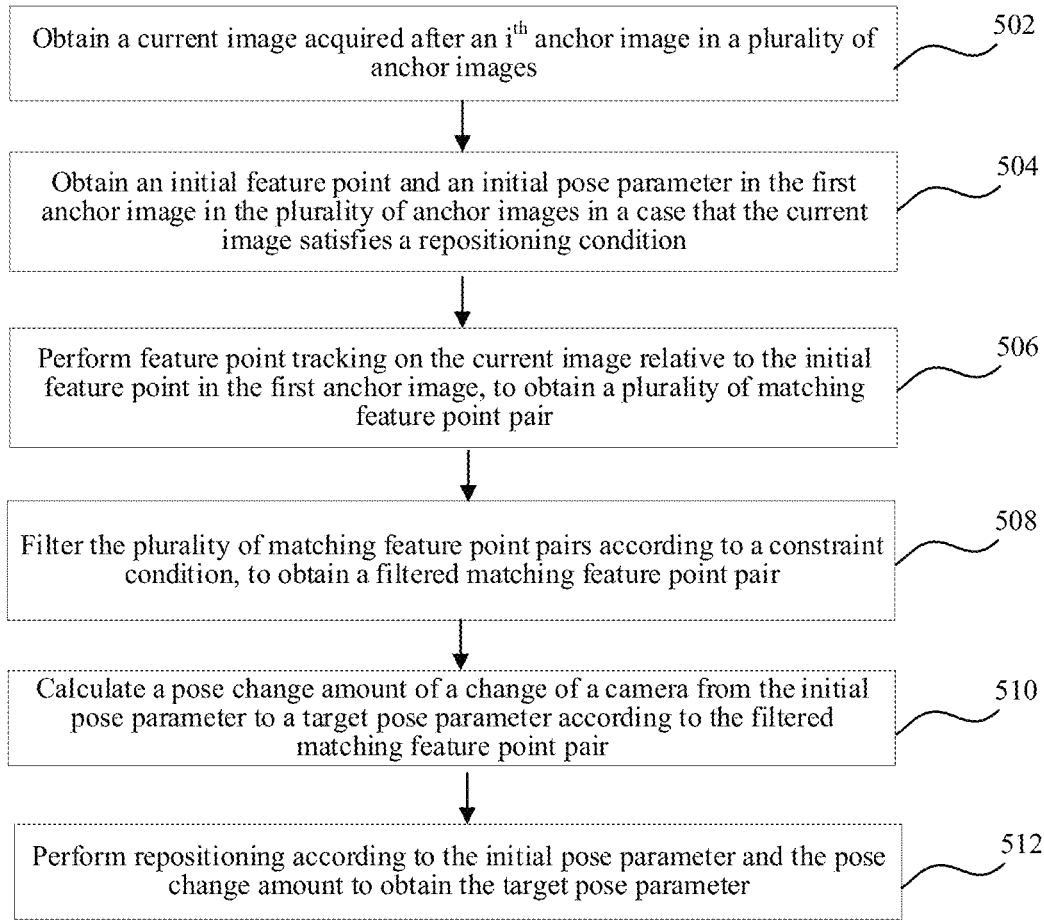
FIG. 5 is a flowchart of a repositioning method in a camera pose tracking process according to an exemplary embodiment of this application.

FIG. 5 is a flowchart of a repositioning method in a camera pose tracking process according to an exemplary embodiment of this application. This embodiment is described by using an example in which the repositioning method is applied to the device shown in FIG. 4. The device is configured to sequentially perform camera pose tracking on a plurality of anchor images. The method includes the following steps:

Step 502: Obtain a current image acquired after an $i^{th}$ anchor image in the plurality of anchor images.

A camera in the device acquires frames of image at an interval of a preset time to form an image sequence. Optionally, the camera acquires frames of image at an interval of a preset time in a movement (translation and/or rotation) process to form an image sequence.

Optionally, the device determines the first frame of image in the image sequence (or one frame of image satisfying a predetermined condition in several frames of image in the front) as the first anchor image, performs feature point tracking on a subsequently acquired image relative to the first anchor image, and calculates a camera pose parameter of the camera according to a feature point tracking result. In a case that the effect of feature point tracking of a current frame of image is poorer than a preset condition, a previous frame of image of the current frame of image is determined as the second anchor image, feature point tracking is performed on a subsequently acquired image relative to the second anchor image, and the camera pose parameter of the camera is calculated according to a feature point tracking result. The rest is deduced by analogy. The device may sequentially perform camera pose tracking on a plurality of consecutive anchor images.

During an $i^{th}$ tracking process corresponding to the $i^{th}$ anchor image, the camera acquires a current image. The current image is a frame of image acquired after the $i^{th}$ anchor image, i being an integer greater than 1.

Step 504: Obtain an initial feature point and an initial pose parameter in the first anchor image in the plurality of anchor images in a case that the current image satisfies a repositioning condition.

The initial pose parameter is used to indicate a camera pose of the camera during acquisition of the first anchor image.

The device determines whether the current image satisfies the repositioning condition. The repositioning condition is used to indicate that a tracking process of the current image relative to the $i^{th}$ anchor image fails, or, the repositioning condition is used to indicate that an accumulated error in historical tracking processes is already greater than the preset condition.

In an optional embodiment, the device tracks the current image relative to the $i^{th}$ anchor image, and determines that a tracking process of the current image relative to the $i^{th}$ anchor image fails, and the current image satisfies the repositioning condition in a case that a feature point matching the $i^{th}$ anchor image does not exist in the current image or a quantity of feature points in the current image that match the $i^{th}$ anchor image is less than a first quantity.

In another optional embodiment, the device determines that an accumulated error in historical tracking processes is already greater than the preset condition in a case that the device determines that a quantity of frames between the current image and an image in previous repositioning is greater than a second quantity, or the device determines that an accumulated error in historical tracking processes is already greater than the preset condition in a case that the device determines that a quantity of anchor images between the $i^{th}$ anchor image and the first anchor image is greater than a third quantity.

Specific condition content of the repositioning condition is not limited in this embodiment.

The device attempts to perform feature point tracking on the current image relative to the first anchor image in a case that the current image satisfies the repositioning condition. In this case, the device obtains a cached initial feature point and initial pose parameter in the first anchor image.

The initial feature point is a feature point extracted from the first anchor image. There may be a plurality of initial feature points, for example, 10 to 500 initial feature points. The initial pose parameter is used to indicate the camera pose of the camera during acquisition of the first anchor image. Optionally, the initial pose parameter includes a rotation matrix R and a displacement vector T. The initial pose parameter may be acquired by an IMU.

Step 506: Perform feature point tracking on the current image relative to the initial feature point in the first anchor image, to obtain a plurality of matching feature point pairs.

Optionally, each matching feature point pair includes one initial feature point and one target feature point that match each other.

A tracking algorithm based on visual odometry may be used for feature point tracking. This is not limited in this application. In an embodiment, a Kanade-Lucas (KLT) optical flow tracking algorithm is used for feature point tracking. In another embodiment, for feature point tracking, an oriented FAST and rotated BRIEF (ORB, fast feature point extraction and description) feature descriptor extracted based on an ORB algorithm is used to perform feature point tracking. In this application, a specific algorithm for feature point tracking is not limited, and a feature point method or a direct method may be used for a feature point tracking process.

In an embodiment, the device performs feature point extraction on the first anchor image, to obtain N initial feature points. The device further performs feature point extraction on the current image, to obtain M candidate feature points. The device then matches the M candidate feature points one by one against the N initial feature points, to determine at least one matching feature point pair. Each matching feature point pair includes one initial feature point and one target feature point. The initial feature point is a feature point in the first anchor image, and the target feature point is a candidate feature point that is in the current image and has the highest matching degree with an $i^{th}$ initial feature point.

Optionally, a quantity of initial feature points is greater than or equal to a quantity of matching feature point pairs. For example, there are 450 initial feature points, and there are 320 matching feature point pairs.

Step 508: Filter the plurality of matching feature point pairs according to a constraint condition, to obtain a filtered matching feature point pair.

Because only at least four matching feature point pairs are needed to complete calculation in a repositioning calculation process. A terminal may choose at least four relatively accurate matching feature point pairs to perform subsequent calculation in a case that the plurality of matching feature point pairs can be used.

Optionally, the terminal filters the plurality of matching feature point pairs according to the constraint condition, to obtain a filtered matching feature point pair. The constraint condition is used to constrain the matching accuracy of a matching feature point pair. The constraint condition includes at least one of the following three conditions:

1. Constraint condition of matching uniqueness

The matching uniqueness is used to indicate a condition that a target feature point is a feature point that uniquely matches the initial feature point.

2. Epipolar constraint check condition

Because two two-dimensional images photographed at different angles are photographed in a same three-dimensional environment in the real world, corresponding points of a matching point in the two two-dimensional images in different views are to be located on a corresponding Epipolar line. That is, a matching feature point pair in the two different two-dimensional images is to satisfy the Epipolar constraint check condition.

The Epipolar constraint check condition is used to detect whether an Epipolar constraint is satisfied between a target feature and an initial feature point.

3. Regional representative constraint condition

In a feature point matching process, a large quantity of feature points may be located in one dense region. In an ideal case, a sufficient distance is required to calculate a homography matrix between two images. The regional representative constraint condition is used to choose a representative target feature point in a local region of the current image.

Step 510: Calculate a pose change amount of the camera from the initial pose parameter to a target pose parameter according to the filtered matching feature point pair.

Optionally, the target pose parameter is used to indicate the camera pose during acquisition of the current image.

Optionally, the device calculates a homography matrix between two frames of image according to at least four filtered matching feature point pairs (an initial feature point and a target feature point); and decomposes the homography matrix to obtain the pose change amount including $R_{reposition}$ and $T_{reposition}$ of the change of the camera from the initial pose parameter to the target pose parameter.

The homography matrix describes a mapping relationship between two planes. The homography matrix may be used to perform movement estimation in a case that feature points in the natural scenario (the real environment) all fall in a same physical plane. The device uses RANdom SAmple Consensus (RANSAC) to decompose the homography matrix obtained by calculating the at least four matching feature point pairs in a case that there are at least four pairs of matching initial feature points and target feature points, to obtain a rotation matrix $R_{reposition}$ and a translation vector $T_{reposition}$.

$R_{reposition}$ is the rotation matrix of the change of the camera from the initial pose parameter to the target pose parameter, and $T_{reposition}$ is a displacement vector of the change of the camera from the initial pose parameter to the target pose parameter.

Step 512: Perform repositioning according to the initial pose parameter and the pose change amount to obtain the target pose parameter.

After performing conversion on the initial pose parameter by using the pose change amount, the device performs repositioning to obtain the target pose parameter, so as to calculate the camera pose of the camera during acquisition of the current image.

Optionally, in a case that repositioning of the current image succeeds, the terminal determines the current image as an $(i+1)^{th}$ anchor image.

The terminal continues to perform feature point tracking based on the $(i+i)^{th}$ anchor image. The terminal may further continue to generate an $(i+2)^{th}$ anchor image, an $(i+3)^{th}$ anchor image, an $(i+4)^{th}$ anchor image, and the like according to subsequent feature point tracking. The rest is deduced by analogy. Details are not described herein again. For a related process, reference may be made to the foregoing tracking content shown in FIG. 3.

In conclusion, in the repositioning method provided in this embodiment, repositioning is performed on a current image and the first anchor image in a case that the current image satisfies a repositioning condition, repositioning can be implemented in an anchor-Switching AR system algorithm for tracking a plurality of consecutive anchor images, and a tracking process is less prone to interruption, thereby resolving a problem that an SLAM repositioning method in the related art is not applicable to repositioning in the field of AR.

In addition, because repositioning is performed on the current image relative to the first anchor image in a repositioning process, it may be considered that the first anchor image has no accumulated error. Therefore, in this embodiment, an accumulated error generated in a tracking process of a plurality of anchor images can further be eliminated.

Figure 6:

Referring to both FIG. 6 and FIG. 7, assuming that the anchor-switching AR system algorithm is applied to the field of AR games, there is one physical keyboard on a desk photographed by a camera. A device overlays one virtual little person onto the return key of the physical keyboard according to a camera pose parameter. In a case that a repositioning technology is not used, a tracking error may occur after a period of time, an obvious offset occurs in a case that the device calculates the position of the virtual little person according to an erroneous camera pose parameter, and the virtual little person is offset to the position of the space key, as shown in FIG. 6. In a case that a repositioning technology is used, an accumulated error is eliminated after repositioning succeeds. In a case that the position of the virtual little person is calculated according to a relatively accurate camera pose parameter, the virtual little person can be kept near the return key.

Several stages of the foregoing repositioning method are described below:

Preprocessing Stage:

In an optional embodiment shown in FIG. 5, because the first anchor image is usually the first frame of image photographed by the camera and is also a current image used in a repositioning process, to increase the success rate of feature point matching, the first anchor image needs to be preprocessed. As shown in FIG. 8, before step 502, the method further includes the following steps:

Step 501a: Record the initial pose parameter corresponding to the first anchor image.

An IMU is disposed in the device, and the IMU periodically acquires a pose parameter of the camera and a time stamp. The pose parameter includes a rotation matrix and a displacement vector, and the time stamp is used to represent an acquisition time of the pose parameter. Optionally, the rotation matrix acquired by the IMU is relatively accurate.

As soon as the camera in the device acquires each frame of image, a photographing time of the frame of image is simultaneously recorded. The device searches for and records the initial pose parameter of the camera during the photographing of the first anchor image according to a photographing time of the first anchor image.

Step 501b: Obtain n pyramid images with different scales corresponding to the first anchor image, n being an integer greater than 1.

The device further extracts an initial feature point from the first anchor image. Optionally, a feature extraction algorithm used by the device to extract a feature point may be a features from accelerated segment test (FAST) detection algorithm, a Shi-Tomasi corner detection algorithm, a Harris corner detection algorithm, a scale-invariant feature transform (SIFT) algorithm, an ORB (fast feature point extraction and description) algorithm or the like.

Because it is relatively difficult to calculate a SIFT feature in real time, to ensure real-time performance, the device may extract an ORB feature point from the first anchor image.

One ORB feature point includes one FAST corner (keypoint) and one binary robust independent elementary feature (BRIER) descriptor.

The FAST corner is the position of the ORB feature point in the image. The FAST corner mainly detects the position of a local pixel with obviously changing grayscale and is well known for high speed. The concept of the FAST corner is that in a case that a pixel is distinctly different from a pixel in a neighboring area (is excessively bright or excessively dark), the pixel may be a corner.

The BRIEF descriptor is a binary vector. The vector describes information about pixels around the key point in a manual design manner. A description vector of the BRIEF descriptor is formed by a plurality of 0s and 1s. The 0s and 1s herein have encoded a value relationship between two pixels near the FAST corner.

It is relatively fast to calculate an ORB feature, which is therefore suitable for implementation on a mobile device. However, because an ORB feature descriptor does not have scale-invariance, and a scale change amount is obvious in a case that a user holds the camera to acquire an image, the user may very likely observe a picture corresponding to the first anchor image in a very far or very near scale. In an optional implementation, the device generates the n pyramid images with different scales for the first anchor image.

The pyramid image is an image obtained after the first anchor image is scaled according to a preset ratio. For example, the pyramid image includes four layers of image. The first anchor image is scaled according to scaling ratios 1.0, 0.8, 0.6, and 0.4, to obtain four images with different scales.

Step 501c: Extract an initial feature point from each pyramid image, and record two-dimensional coordinates of the initial feature point in a case that the pyramid image is scaled to the original size.

The device extracts a feature point from each layer of the pyramid image and calculates an ORB feature descriptor. For a feature point extracted from the pyramid image that is not in the original scale (1.0), after the pyramid image is scaled up to the original scale according to a scaling ratio, two-dimensional coordinates of each feature point in the pyramid image in the original scale are recorded. These feature points and two-dimensional coordinates in the pyramid image may be referred to as layer-key points. In an example, there are 500 at most feature points in each layer of the pyramid image.

For the first anchor image, a feature point in each pyramid image is determined as an initial feature point. In a subsequent feature point tracking process, high-frequency details in the current image are all clearly visible in a case that a current image is in a very large scale, so that the current image and a relatively low layer of the pyramid image (for example, the original image) have a higher matching score. Conversely, only blurry low-frequency information can be seen in the current image in a case that a current image is in a very small scale, so that the current image and a relatively high layer of the pyramid image have a higher matching score.

In the example shown in FIG. 9, the first anchor image has three pyramid images 91, 92, and 93. The pyramid image 91 is located at the first layer of the pyramid and is one of the three images that is in the smallest scale. The pyramid image 92 is located at the second layer of the pyramid and is one of the three images that is in the middle scale. The pyramid image 93 is located at the third layer of the pyramid and is one of the three images that has the largest scale. In a case that feature point tracking is performed on a current image 94 relative to the first anchor image, the device may respectively match the current image 94 against feature points extracted from the three pyramid images. Because the pyramid image 93 and the current image 94 have closer scales, feature points extracted from the pyramid image 93 have a higher matching score.

In this embodiment, pyramid images with a plurality of scales are set for the first anchor image, and an initial feature point in each layer of the pyramid image is further extracted and used for a subsequent feature point tracking process. By means of joint matching of feature points in a plurality of scales, the scale of the first anchor image is automatically adjusted, thereby implementing scale-invariance.

Feature Point Tracking Stage:

In an optional embodiment shown in FIG. 5, for the feature point tracking process shown in step 506, assuming that there are N initial feature points in the first anchor image and there are M candidate feature points in the current image, the calculation complexity of a normal feature point tracking process is Nm times. To reduce the calculation complexity of the feature point tracking process, a terminal performs matching acceleration based on a bag-of-words (BoW) model. The BoW model is a commonly used concept in the field of natural speech processing. A text is used as an example. One article may have ten thousand words. There may only be 500 different words appearing at different frequencies. The BoW refers to bags, each filled with the $i^{th}$ same words. This constitutes a text representation manner. Such a representation manner does not take grammar and word sequences into consideration. In the computer vision field, an image is usually represented by a feature point and a feature descriptor of the feature point. In a case that the feature descriptor of the feature point is seen as a word, a corresponding BoW model can be constructed.

Figure 10:
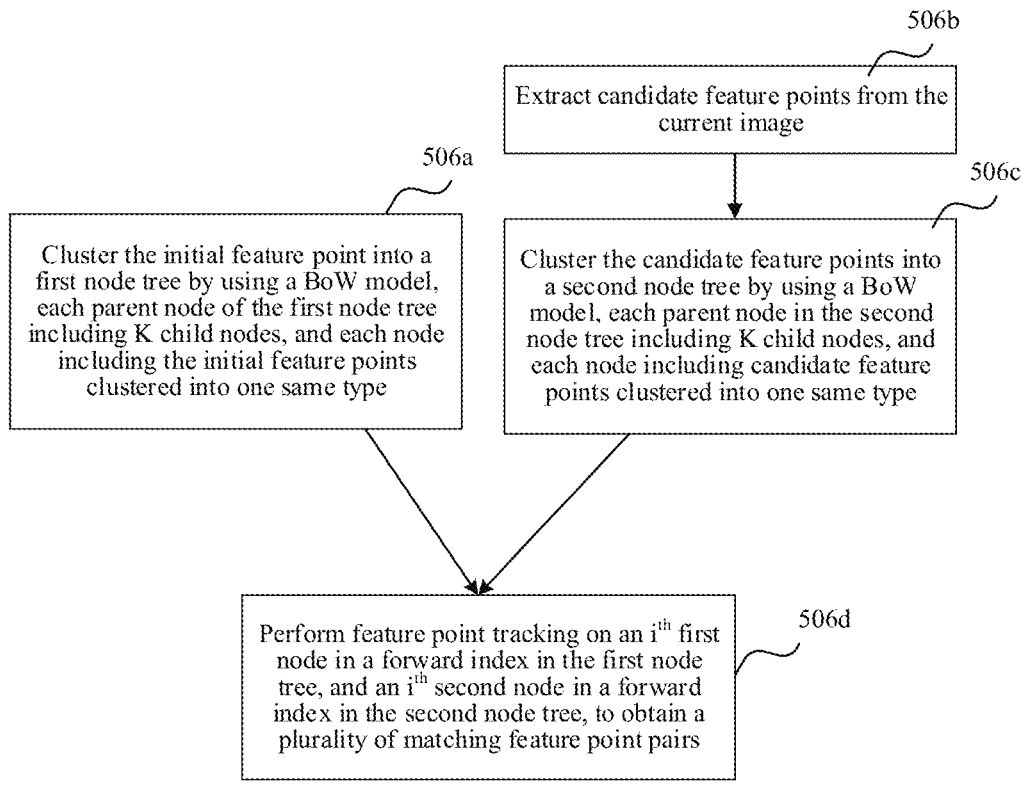
FIG. 10 is a flowchart of a repositioning method in a camera pose tracking process according to an exemplary embodiment of this application.

In this case, step 506 includes the following sub-steps, as shown in FIG. 10:

Step 506a: Cluster the initial feature point into a first node tree by using a BoW model, each parent node of the first node tree including K child nodes, and each node including initial feature points clustered into one same type.

Optionally, the initial feature point is represented by an ORB feature point. Each ORB feature point includes a FAST corner and a BRIER descriptor. The BRIER descriptor can represent a feature of the initial feature point, and the feature can be used to perform clustering.

A DBoW2 library may be used for the BoW in this embodiment. The DBoW2 library is an open-source software library developed by Lopez, et al. from University of Zara. The device clusters a plurality of initial feature points into the first node tree by using the BoW model.

Figure 11:
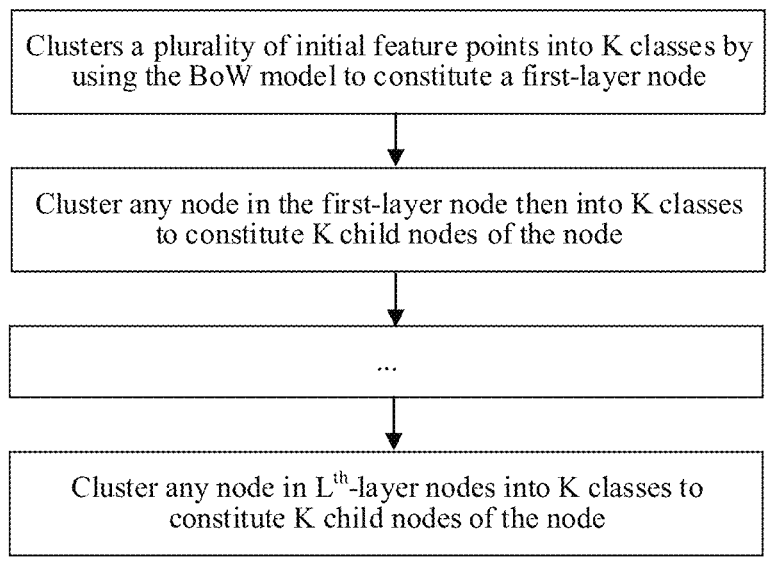
FIG. 11 is a flowchart of a repositioning method in a camera pose tracking process according to an exemplary embodiment of this application.

Optionally, as shown in FIG. 11, the device first uses a plurality of initial feature points as a root node of the first node tree, and clusters a plurality of initial feature points into K classes by using the BoW model to constitute a first-layer node, each node including initial feature points of a same type. Any node in the first-layer node is then clustered into K classes to constitute K child nodes of the node. The rest is deduced by analogy. The device clusters any node in $L^{th}$-layer nodes into K classes to constitute K child nodes of the node. Optionally, a K-means clustering algorithm is used for a clustering algorithm. In the K-means clustering algorithm, features extracted from an image in a training set may be used to perform training.

Step 506b: Extract candidate feature points from the current image.

The device further extracts an initial feature point from the first anchor image. Optionally, a feature extraction algorithm used by the device to extract a feature point may be a features from accelerated segment test (FAST) detection algorithm, a Shi-Tomasi corner detection algorithm, a Harris corner detection algorithm, a SIFT algorithm, an ORB (fast feature point extraction and description) algorithm or the like.

Because it is relatively difficult to calculate a SIFT feature in real time, to ensure real-time performance, the device may extract an ORB feature point from the first anchor image. One ORB feature point includes one FAST corner and one binary robust independent elementary feature (BRIER) descriptor. Certainly, in a case that the device has a sufficient computing capability, a SIFT feature may be extracted. This is not limited in this embodiment of this application. It is only necessary to extract features of a same type from the first anchor image and the current image.

Step 506c: Cluster the candidate feature points into a second node tree by using a BoW model, each parent node in the second node tree including K child nodes, and each node including candidate feature points clustered into one same type.

Optionally, the candidate feature point is represented by an ORB feature point. Each ORB feature point includes a FAST corner and a BRIER descriptor. The BRIER descriptor can represent a feature of the candidate feature point, and the feature can be used to perform clustering.

A DBoW2 library may be used for the BoW in this embodiment. The DBoW2 library is an open-source software library developed by Lopez, et al. from University of Zara. The device clusters a plurality of candidate feature points into the second node tree by using the BoW model.

Optionally, the device first uses a plurality of candidate feature points as a root node of the second node tree, and clusters a plurality of candidate feature points into K classes by using the BoW model to constitute a first-layer node, each node including candidate feature points of a same type. Any node in the first-layer node is then clustered into K classes to constitute K child nodes of the node. The rest is deduced by analogy. The device clusters any node in $L^{th}$-layer nodes into K classes to constitute K child nodes of the node. Optionally, a K-means clustering algorithm is used for a clustering algorithm. In the K-means clustering algorithm, features extracted from an image in a training set may be used to perform training.

Step 506d: Perform feature point tracking on an $i^{th}$ first node in a forward index in the first node tree, and an $i^{th}$ second node in a forward index in the second node tree, to obtain a plurality of matching feature point pairs.

Optionally, the forward index is a sequence used to perform traversal in a depth-first traversal sequence or breadth-first traversal sequence. The $i^{th}$ first node and the $i^{th}$ second node are nodes at the same position in two node trees. For example, the $i^{th}$ first node is the third node in the third-layer node in the first node tree, and the $i^{th}$ second node is the third node in the third-layer node in the second node tree.

Optionally, the $i^{th}$ first node is an intermediate node in the first node tree, the $i^{th}$ second node is an intermediate node in the second node tree, and the intermediate node is a node located between a root node and a leaf node. In a case that the $i^{th}$ first/second node is a root node, the calculation complexity is not simplified as compared with a normal feature point tracking process. In a case that the $i^{th}$ first/second node is a leaf node, a correctly matching feature point may be missed. It is set that the $i^{th}$ first node and the $i^{th}$ second node are in an Lth layer of the node tree, the first anchor image has N feature points, the current image has M feature points, and each parent node has K child nodes, so that in this method, a point search range is reduced to $(N)^\wedge(M/(K^\wedge L))$, thereby implementing exponentially accelerated matching.

Figure 12:
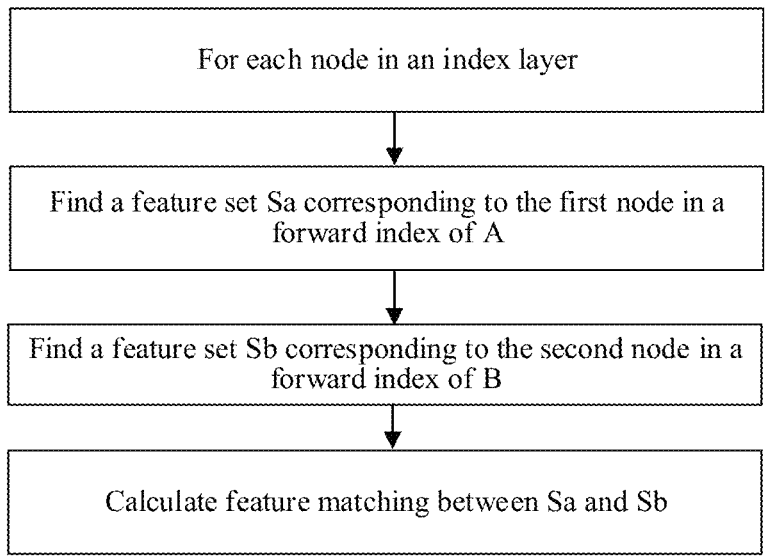
FIG. 12 is a flowchart of a repositioning method in a camera pose tracking process according to an exemplary embodiment of this application.

In a schematic example, as shown in FIG. 12, the first anchor image has N initial feature points, and the N initial feature points are clustered into the first node tree. The current image has M target feature points (matching M initial feature points), M≤N, and M target feature points are clustered into the second node tree. The third-layer nodes (counting from the root node) in the two node trees are used as an index layer. For each node in an index layer, a feature set Sa corresponding to the first node in a forward index of A is found, a feature set Sb corresponding to the second node in a forward index of B is found, and feature matching is calculated between Sa and Sb. Because there are about several to tens of initial feature points of a same type in the first node and the second node, there are the same or a smaller quantity of target feature points in the current image. Therefore, the quantity of times of matching is reduced to the matching between two sets (there are several to tens of feature points).

In conclusion, in the repositioning method provided in this embodiment, feature points in two images are respectively clustered into two node trees based on a BoW model, and nodes at the same position in the two node trees are used to reduce a matching range during feature point matching, thereby implementing the acceleration of a feature point tracking process, so that feature point tracking of a current image relative to the first anchor image can be implemented faster, to implement a faster repositioning effect.

Feature Point Filtering Stage

In a case that feature point extraction is performed on the first anchor image, pyramid images with different scales are used to extract a large quantity of features. Therefore, there are a large quantity of incorrect matches in a plurality of matching feature point pairs that are eventually obtained by using either a normal feature point tracking process or the feature point tracking process based on BoW acceleration in the foregoing optional embodiment. For an anchor-SLAM system, a homography matrix corresponding to two images is decomposed to calculate a rotation matrix and a translation vector of the camera. Therefore, at least only four matching feature point pairs are required, and more points may cause unnecessary errors during RANSAC. Therefore, an actual calculation process does not require too many matching feature point pairs but instead requires a few highly accurate matching feature point pairs. In the optional embodiment based on FIG. 5, in the process of filtering the plurality of matching feature point pairs according to a constraint condition shown in step 508, the following three methods are optionally used to filter the plurality of matching feature point pairs.

1. Matching Uniqueness Check

One same initial feature point may have a plurality of candidate feature points in a target image. There is a matching degree between each candidate feature point and the initial feature point. A candidate feature point ranking first is usually determined as a target feature point matching the initial feature point. However, in a feature point matching process, two candidate feature points with a very close matching degree tend to appear. For example, there is a repeated pattern on a tablecloth. The two candidate feature points with a very close matching degree may very likely cause an incorrect match. That is, a matching feature point pair of this type is highly prone to an exception to cause a matching error, does not have uniqueness, and is to be deleted.

Therefore, in a matching uniqueness condition, there is a particular distance between the candidate feature point (target feature point) ranking first and the candidate feature point ranking second of each initial feature point. That is, a target feature point is a feature point that uniquely matches the initial feature point, or otherwise the matching feature point pair is discarded.

Figure 13:
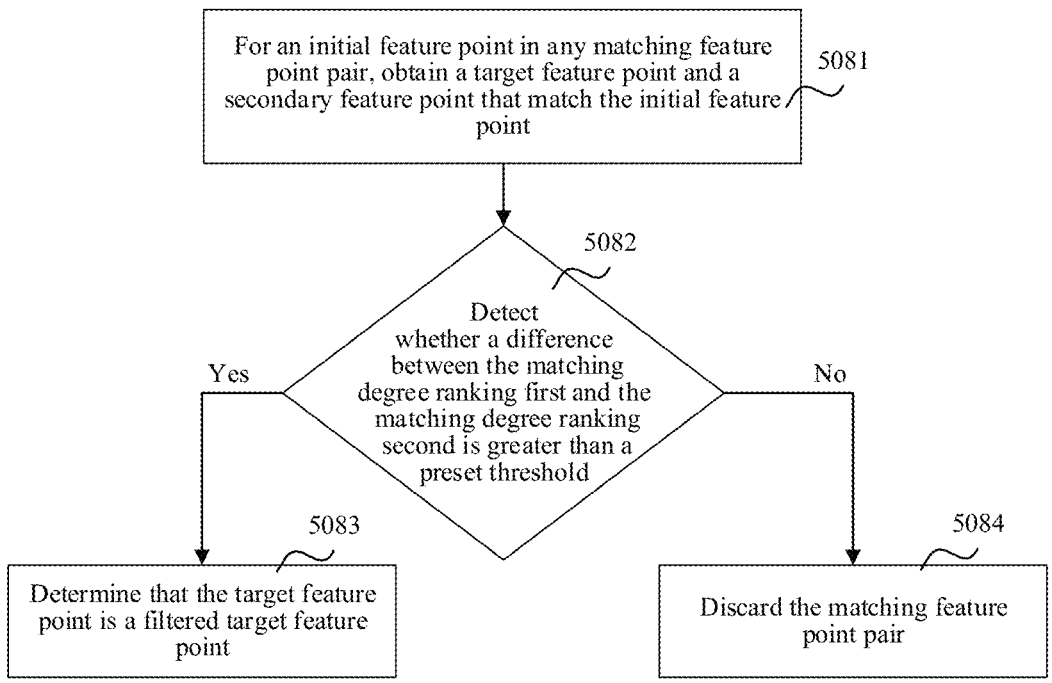
FIG. 13 is a flowchart of a repositioning method in a camera pose tracking process according to an exemplary embodiment of this application.

Referring to FIG. 13, in this case, step 508 optionally includes the following steps:

Step S081: For an initial feature point in any matching feature point pair, obtain a target feature point and a secondary feature point that match the initial feature point, the target feature point being a feature point with a matching degree ranking first in a plurality of candidate feature points matching the initial feature point, and the secondary feature point being a feature point with a matching degree ranking second in the plurality of candidate feature points matching the initial feature point.

Step S082: Detect whether a difference between the matching degree ranking first and the matching degree ranking second is greater than a preset threshold.

Optionally, the preset threshold is 80%. It is set that the matching degree (a matching degree between the target feature point and the initial feature point) ranking first is X, and the matching degree (a matching degree between the secondary feature point and the initial feature point) ranking second is Y, so that it is detected whether X-Y is greater than 80% of X. Step S083 is performed in a case that X-Y is greater than 80%, and step S084 is performed in a case that X-Y is less than 80%.

Step S083: Determine that the target feature point is a filtered target feature point in a case that the difference between the matching degree ranking first and the matching degree ranking second is greater than the preset threshold.

A target feature point is a feature point that uniquely matches the initial feature point in a case that the difference between the matching degree ranking first and the matching degree ranking second is greater than the preset threshold and satisfies a filtering condition. The matching feature point pair is determined as a filtered matching feature point pair, or, filtering with another constraint condition continues to be performed.

Step S084: Discard the matching feature point pair in a case that the difference between the matching degree ranking first and the matching degree ranking second is less than the preset threshold.

The matching feature point pair is highly prone to a matching error in a case that the difference between the matching degree ranking first and the matching degree ranking second is less than the preset threshold, and the matching feature point pair is to be discarded.

In conclusion, in the repositioning method provided in this embodiment, a matching feature point pair is filtered according to matching uniqueness check, and a matching feature point pair that is relatively highly prone to a matching error can be filtered out, so as to ensure that the filtered matching feature point pair satisfies matching uniqueness, thereby improving the calculation accuracy in a subsequent repositioning process.

2. Epipolar Constraint Check

Because of the locality of a feature point, there may be an incorrect match in the plurality of matching feature point pairs that has a very high matching degree and satisfies matching uniqueness but obviously does not satisfy a requirement in geometric positions. Such a geometric relationship may be constrained by using an Epipolar constraint.

The Epipolar constraint means that a corresponding point of a matching point in another view is located on a corresponding Epipolar line. For an anchor-switching AR system, because each frame of image is photographed by using one same camera in different camera poses, a correct matching feature point pair definitely satisfies an Epipolar constraint.

Figure 14:
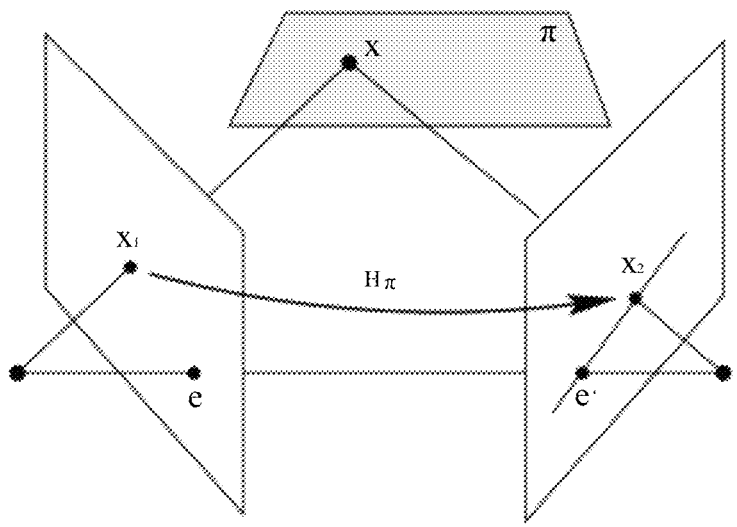
FIG. 14 is a schematic diagram of the principle of an Epipolar constraint condition according to an exemplary embodiment of this application.

FIG. 14 is a schematic diagram of the principle of an Epipolar constraint. A three-dimensional point x exists in a plane in the real world, so that an observation point $x_1$ exists in the left imaging plane, and an observation point $x_2$ exists in the right imaging plane, and the following relationship is definitely satisfied:

$$X_2 = R^* X_1 + T,$$

where R is a rotation matrix between two camera poses, and T is a displacement vector between the two camera poses.

Both sides are cross-multiplied by T to obtain:

$$T \times X_2 = T \times R^* X_1;$$

both sides are left-multiplied by $X_2$, and the equation is 0, to obtain:

$$X_2 {}^* T \times X_2 = 0 = X_2 {}^* T \times R^* X_1; \text{ and}$$

T*R is an obtained basis matrix F, so that:

$$X_2 \times R^* X_1 = 0.$$

Obviously, for any group of matching points, there is definitely the restriction of the foregoing basis matrix, and at least eight matching feature point pairs are needed to calculate a basis matrix F. Therefore, after the at least eight matching feature point pairs (for example, eight matching feature point pairs satisfying matching uniqueness) are chosen through filtering, and a RANSAC method is used to fit one basis matrix F to verify an Epipolar error, so as to filter out those points that have a high matching score but incorrect geometric coordinates, thereby ensuring geometric consistency.

Figure 15:
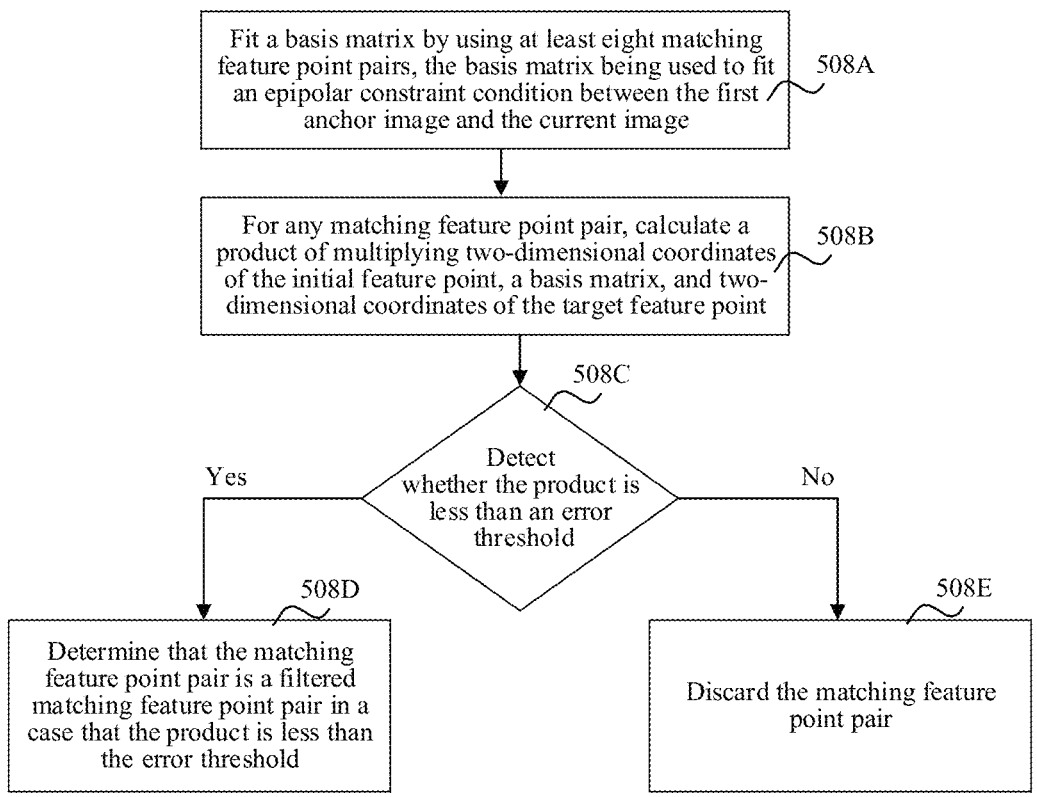
FIG. 15 is a flowchart of a repositioning method in a camera pose tracking process according to an exemplary embodiment of this application.

Referring to FIG. 15, in this case, step 508 optionally includes the following steps:

Step 508A: Fit a basis matrix by using the at least eight matching feature point pairs, the basis matrix being used to fit an Epipolar constraint condition between the first anchor image and the current image.

Optionally, at least eight groups of matching feature points filtered by using a matching uniqueness check condition are used to fit a feature point pair of a basis matrix.

Optionally, at least eight groups of matching feature points are used to perform calculation of RANSAC, to calculate a homography matrix between the first anchor image and the current image, and the homography matrix is decomposed to obtain a rotation matrix and a displacement vector. The rotation matrix is multiplied by the displacement vector to fit the basis matrix F.

Step 508B: For any matching feature point pair, calculate a product of multiplying two-dimensional coordinates of the initial feature point, a basis matrix, and two-dimensional coordinates of the target feature point.

For any candidate matching feature point pair, calculation is performed according to are the following formula:

$$X_2 {}^* F^* X_1,$$

where $X_2$ is the two-dimensional coordinates of the target feature point in the current image, $X_1$ is the two-dimensional coordinates of the initial feature point in the first anchor image, and F is the basis matrix fit in a previous step.

Step 508C: Detect whether the product is less than an error threshold.

In an ideal case, the product needs to be zero. However, due to the presence of an error, the product is not always zero. Therefore, one error threshold may be preset. In a case that the product is within the error threshold, it is considered that the Epipolar constraint is satisfied between the initial feature point and the target feature point.

Step 508D is performed in a case that the product is less than the error threshold. Step 508E is performed in a case that the product is greater than or equal to the error threshold.

Step 508D: Determine that the matching feature point pair is a filtered matching feature point pair in a case that the product is less than the error threshold.

It is considered that a filtering condition is satisfied in a case that the product is less than the error threshold, and the matching feature point pair is determined as the filtered matching feature point pair, or, filtering with another constraint condition continues to be performed.

Step 508E: Discard the matching feature point pair in a case that the product is greater than or equal to the error threshold.

Figure 16:
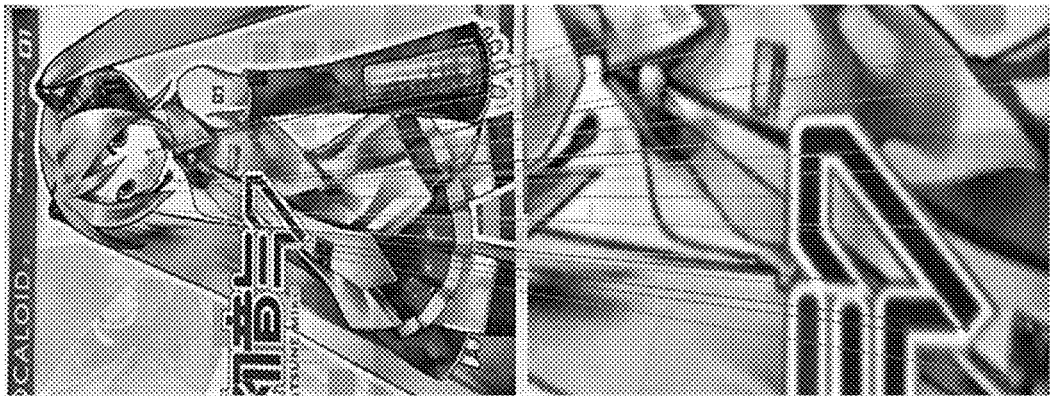
FIG. 16 is a schematic diagram of the principle of a feature point tracking process according to an exemplary embodiment of this application.

In conclusion, in the repositioning method provided in this embodiment, a matching feature point pair is filtered according to Epipolar constraint check, and a matching feature point pair that does not satisfy a geometric position can be filtered out, thereby ensuring that the filtered matching feature point pair satisfies an Epipolar constraint characteristic, to improve the calculation accuracy in a subsequent repositioning process 3. Regional Representative Constraint In a feature point matching process, a large quantity of target feature points may appear in one same dense region in a target image. In particular, all initial feature points extracted from pyramid images with different scales are scaled to the original scale. Therefore, several target feature points in different scales may more likely match the initial feature point in a small range. As shown in FIG. 16, it is set that the left-side image is the first anchor image (a born anchor or a born image), and the right-side image is the current image. Because the camera is very close to a real scene during acquisition of the current image, the current image can only successfully match a local region in the first anchor image. In this case, all matching feature point pairs gather in one local region in the first anchor image, and there is a scale pyramid, resulting in less representative matching in the local region.

In an ideal case, in a repositioning calculation process, feature points used to calculate a homography matrix need to have a sufficient distance, and are optimally distributed as far as possible in an anchor image, so that such points are more representative. Therefore, the regional representative constraint means that in all local regions of the current image, representative target feature points are chosen from each local region.

Figure 17:
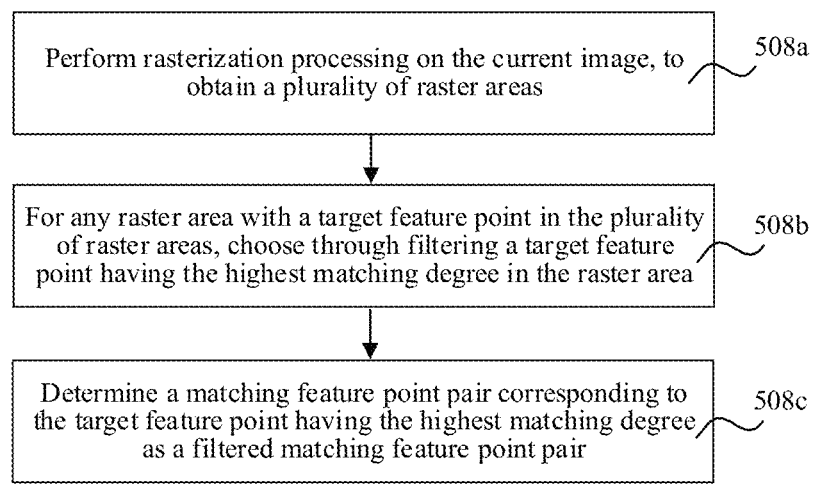
FIG. 17 is a flowchart of a repositioning method in a camera pose tracking process according to an exemplary embodiment of this application.

In the optional embodiment based on FIG. 5, a raster-based filtering method is provided. As shown in FIG. 17, in this case, step 508 optionally includes the following sub-steps:

Step 508a: Perform rasterization processing on the current image, to obtain a plurality of raster areas.

The device performs rasterization processing on the current image according to a preset raster size. The current image is divided into the plurality of raster areas do not overlap each other.

Step 508b: For any raster area with a target feature point in the plurality of raster areas, choose through filtering a target feature point having the highest matching degree in the raster area.

Figure 18:
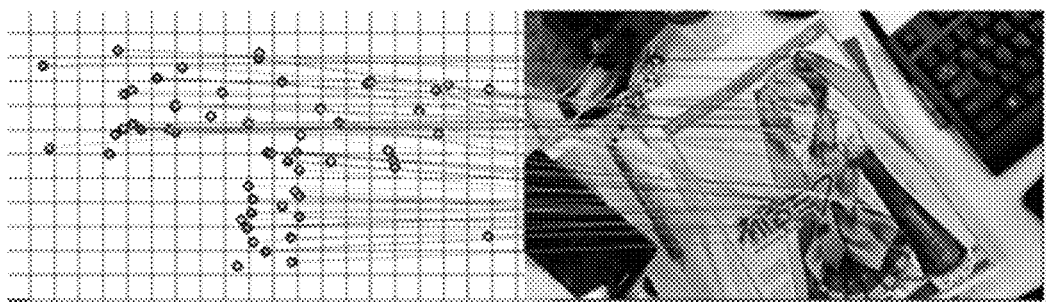
FIG. 18 is a schematic diagram of the principle of a rasterization process of filtering feature points according to an exemplary embodiment of this application.

Target feature points in the plurality of matching feature point pairs are distributed in the plurality of raster areas. There may be zero to a plurality of target feature points in each raster area. For any raster area with a target feature point, a target feature point having the highest matching degree in the raster area is chosen through filtering. As shown in FIG. 18, the left image shows a preset raster. The preset raster is used to rasterize the current image, to obtain the plurality of raster areas. A target feature point is filtered in each raster area, and a target feature point having the highest matching degree is chosen through filtering.

Step 508c: Determine a matching feature point pair corresponding to the target feature point having the highest matching degree as a filtered matching feature point pair.

A matching feature point pair in which the target feature point is located is determined as a filtered matching feature point pair in a case that there is one target feature point in a raster area.

In a case that there are more than two target feature points in the raster area, a matching degree between each target feature point and a corresponding initial feature point is obtained, and a matching feature point pair in which the target feature point having the highest matching degree is located is determined as the filtered matching feature point pair.

In conclusion, in the repositioning method provided in this embodiment, a target feature point having the highest matching degree is chosen through filtering from each raster area and is used as a representative target feature point in the raster area. The representative target feature point can uniquely represent the current raster area. A homography matrix calculated in such a repositioning process has better robustness, and at the same time the quantity of raster areas can restrict a maximum quantity during calculation of the homography matrix, thereby ensuring the calculation speed of calculating the homography matrix.

Repositioning Calculation Process

In an optional embodiment shown in FIG. 5, for the process of calculating the pose change amount of the camera pose shown in step 510, after obtaining a plurality of filtered matching feature point pairs, the device inputs the plurality of matching feature point pairs (an initial feature point and a target feature point) into a RANSAC algorithm, and calculates a homography matrix of a current image relative to the first anchor image. A decomposition algorithm in an IMU may decompose the homography matrix to obtain a rotation matrix $R_{reposition}$ $R_{relocalize}$ and a translation vector $T_{reposition}$, that is, a target pose parameter of the camera during acquisition of the current image.

Figure 19:
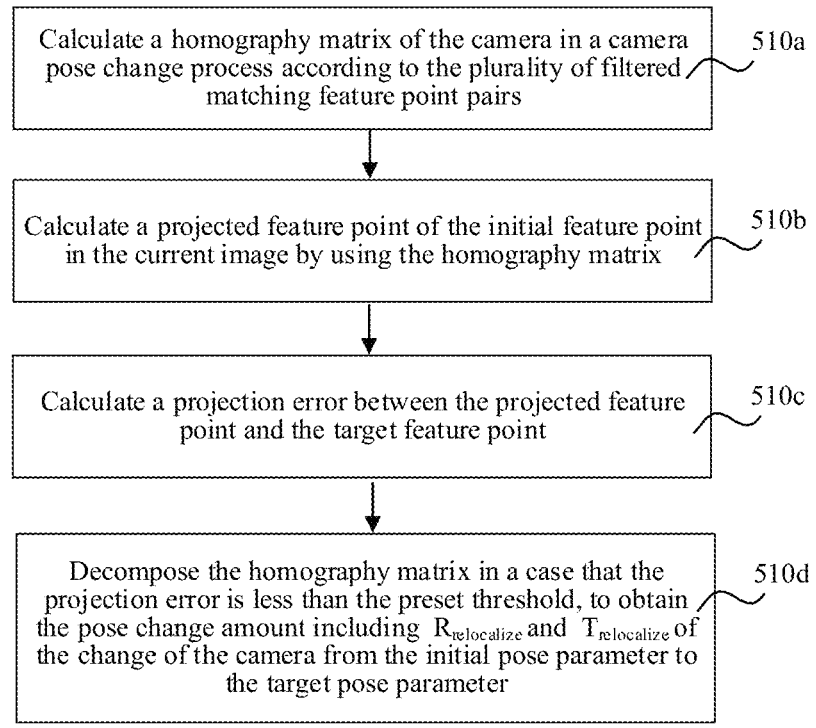
FIG. 19 is a flowchart of a repositioning method in a camera pose tracking process according to an exemplary embodiment of this application.

As shown in FIG. 19, step 510 optionally includes the following sub-steps:

Step 510a: Calculate a homography matrix of the camera in a camera pose change process according to the plurality of filtered matching feature point pairs.

The device inputs the plurality of matching feature point pairs (an initial feature point and a target feature point) into a RANSAC algorithm, to calculate the homography matrix of the current image relative to the first anchor image.

Step 510b: Calculate a projected feature point of the initial feature point in the current image by using the homography matrix.

The device filters all the initial feature points to choose an initial feature point having a matching target feature point, and calculates a projected feature point of each initial feature point in the current image. Optionally, each initial feature point is multiplied by the homography matrix, to obtain a projected feature point of each initial feature point in the current image.

Step 510*c*: Calculate a projection error between the projected feature point and the target feature point.

For each initial feature point, a projection error between the projected feature point and the target feature point corresponding to the initial feature point is calculated. In a case that a distance between the projected feature point and the target feature point is less than a distance error, it is considered that the target feature point is inlier. In a case that the distance between the projected feature point and the target feature point is greater than the distance error, it is considered that the target feature point is an outlier. The device then calculates a ratio of a quantity of outliers to a total quantity of all target feature points.

Step 510*d*: Decompose the homography matrix in a case that the projection error is less than the preset threshold, to obtain the pose change amount including $R_{reposition}$ and $T_{reposition}$ of the change of the camera from the initial pose parameter to the target pose parameter.

Optionally, the preset threshold is 50%.

It is considered that a homography matrix obtained in the current time of calculation is reliable in a case that the ratio of the quantity of outliers to the total quantity of target feature points is less than 50%, and the device decomposes the homography matrix to obtain the pose change amount including $R_{reposition}$ and $T_{reposition}$ of the change of the camera from the initial pose parameter to the target pose parameter. It is considered that a homography matrix obtained in the current time of calculation is not reliable in a case that the ratio of the quantity of outliers to the total quantity of target feature points is greater than 50%, and a current result is discarded.

The calculation process shown in step 510*b* and step 510*c* is an optional step.

In conclusion, in the repositioning method provided in this embodiment, a quantity of outliers can be calculated to check a homography matrix, and a current result is discarded in a case that check fails, thereby ensuring the calculation accuracy of a homography matrix, to ensure the calculation accuracy of a repositioning result.

In a schematic example, the foregoing repositioning method in a camera pose tracking process may be used in an AR program. By means of the repositioning method, a pose of a camera on an electronic device can be tracked in real time according to scene information in the real world, and a display position of an AR element in an AR application is adjusted and changed according to a tracking result. An AR program run on the mobile phone in FIG. 1 or FIG. 2 is used as an example. In a case that a still cartoon character standing on a book needs to be displayed, no matter how a user moves the mobile phone, it is only necessary to change a display position of the cartoon character according to a pose change of a camera on the mobile phone, so that the standing position of the cartoon character on the book can be kept unchanged.

The following provides apparatus embodiments of this application. For technical details that are not specifically described in the apparatus embodiments, refer to the description in the foregoing method embodiments. Details are not described one by one herein again.

Figure 20:
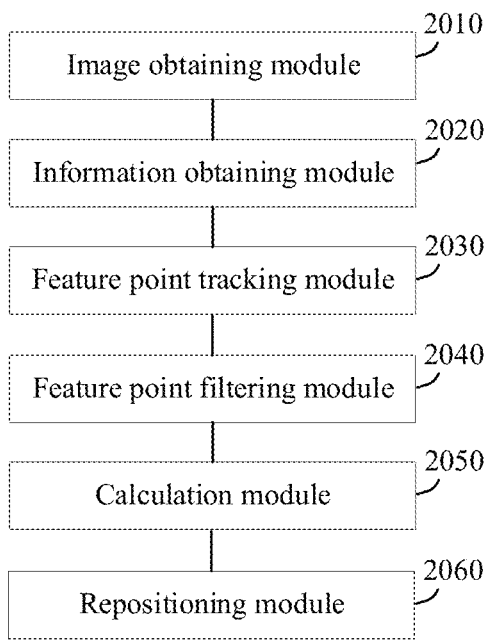
FIG. 20 is a block diagram of a repositioning apparatus in a camera pose tracking process according to an exemplary embodiment of this application.

FIG. 20 is a structural block diagram of a repositioning apparatus in a camera pose tracking process according to an exemplary embodiment of this application. The repositioning apparatus may be implemented by software, hardware or a combination of software and hardware as an entire electronic device or a part of the electronic device. The electronic device is configured to sequentially perform camera pose tracking on a plurality of anchor images. The apparatus includes:

an image obtaining module 2010, configured to obtain a current image acquired after an $i^{th}$ anchor image in the plurality of anchor images, i being greater than 1;

an information obtaining module 2020, configured to obtain an initial feature point and an initial pose parameter in the first anchor image in the plurality of anchor images in a case that the current image satisfies a repositioning condition;

a feature point tracking module 2030, configured to perform feature point tracking on the current image relative to the initial feature point in the first anchor image, to obtain a plurality of matching feature point pairs;

a feature point filtering module 2040, configured to filter the plurality of matching feature point pairs according to a constraint condition, to obtain a filtered matching feature point pair;

a calculation module 2050, configured to calculate a pose change amount of a camera from the initial pose parameter to a target pose parameter according to the filtered matching feature point pair; and a repositioning module 2060, configured to perform repositioning according to the initial pose parameter and the pose change amount to obtain the target pose parameter of the camera.

In an optional embodiment, the constraint condition includes at least one of the following conditions:

a target feature point is a feature point that uniquely matches the initial feature point;

the initial feature point and a target feature point satisfy an Epipolar constraint; or a target feature point is a feature point with the highest matching degree in a raster area, and the raster area is an area obtained after the current image is rasterized.

In an optional embodiment, the constraint condition includes that a target feature point is a feature point that uniquely matches the initial feature point; and the feature point filtering module 2040 is configured to: for an initial feature point in any matching feature point pair, obtain a target feature point and a secondary feature point that match the initial feature point, the target feature point being a feature point with a matching degree ranking first in a plurality of candidate feature points matching the initial feature point, and the secondary feature point being a feature point with a matching degree ranking second in the plurality of candidate feature points matching the initial feature point; and determine that the target feature point is the filtered target feature point in a case that the difference between the matching degree ranking first and the matching degree ranking second is greater than a preset threshold.

In an optional embodiment, the constraint condition includes that the initial feature point and a target feature point satisfy an Epipolar constraint; or the feature point filtering module 2040 is configured to: for any matching feature point pair, calculate a product of multiplying two-dimensional coordinates of the initial feature point, a basis matrix, and two-dimensional coordinates of the target feature point, the basis matrix being used to fit an Epipolar constraint condition between the first anchor image and the current image; and determine that the matching feature point pair is the filtered matching feature point pair in a case that the product is less than an error threshold.

In an optional embodiment, the constraint condition includes that a target feature point is a feature point with the highest matching degree in a raster area; and the feature point filtering module 2040 is configured to: perform rasterization processing on the current image, to obtain a plurality of raster areas; for any raster area with a target feature point in the plurality of raster areas, choose through filtering a target feature point having the highest matching degree in the raster area; and determine the matching feature point pair corresponding to the target feature point having the highest matching degree as the filtered matching feature point pair.

In an optional embodiment, the feature point tracking module 2030 is configured to: cluster the initial feature point into a first node tree by using a BoW model, each parent node of the first node tree including K child nodes, and each node including initial feature points clustered into one same type; extract candidate feature points from the current image, and cluster the candidate feature points into a second node tree by using a BoW model, each parent node in the second node tree including K child nodes, and each node including candidate feature points clustered into one same type; and perform feature point tracking on an $i^{th}$ first node in a forward index in the first node tree, and an $i^{th}$ second node in a forward index in the second node tree, to obtain the plurality of matching feature point pairs.

In an optional embodiment, the $i^{th}$ first node is an intermediate node in the first node tree, the $i^{th}$ second node is an intermediate node in the second node tree, and the intermediate node is a node located between a root node and a leaf node.

In an optional embodiment, the calculation module 2050 is configured to: calculate a homography matrix of the camera in a camera pose change process according to the plurality of filtered matching feature point pairs; and decompose the homography matrix, to obtain the pose change amount including $R_{reposition}$ and $T_{reposition}$ of the change of the camera from the initial pose parameter to the target pose parameter.

In an optional embodiment, the calculation module 2050 is configured to: calculate a projected feature point of the initial feature point in the current image by using the homography matrix; calculate a projection error between the projected feature point and the target feature point; perform the step of decomposing the homography matrix in a case that the projection error is less than the preset threshold, to obtain the pose change amount including $R_{reposition}$ and $T_{reposition}$ of the change of the camera from the initial pose parameter to the target pose parameter.

Figure 21:
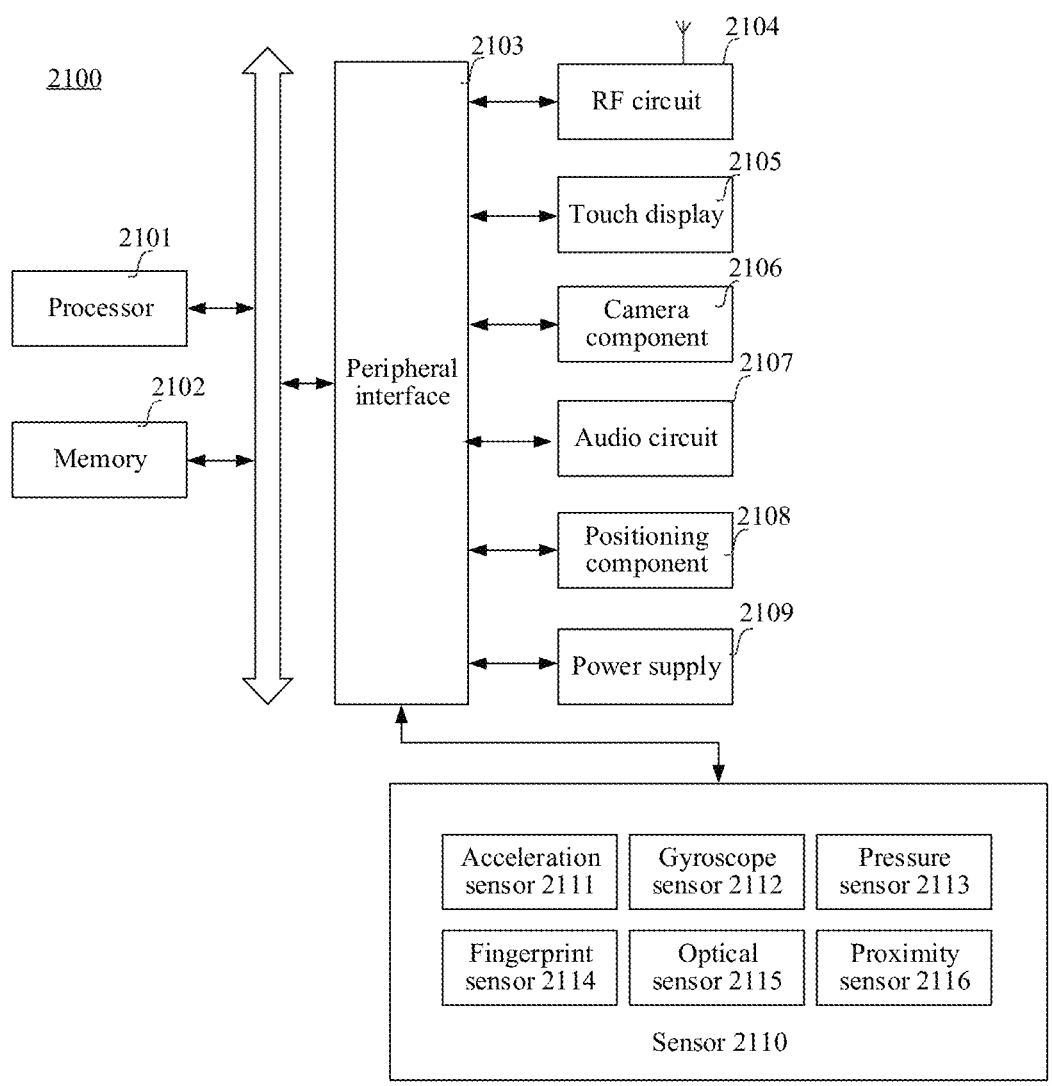
FIG. 21 is a block diagram of an electronic device according to an exemplary embodiment of this application.

FIG. 21 is a structural block diagram of an electronic device 2100 according to an exemplary embodiment of this application. The electronic device 2100 may be a smart phone, a tablet computer, a Moving Picture Experts Group Audio Layer III (MP3) player, a Moving Picture Experts Group Audio Layer IV (MP4) player, a laptop computer or a desktop computer. The electronic device 2100 may also be referred to as user equipment, a portable electronic device, a laptop electronic device, and a desktop electronic device, among other names.

Generally, the electronic device 2100 includes a processor 2101 and a memory 2102.

The processor 2101 may include one or more processing cores, for example, a 4-core processor, an 8-core processor, and the like. The processor 2101 may be implemented in at least one hardware form of a digital signal processor (DSP), a field-programmable gate array (FPGA), and a programmable logic array (PLA). The processor 2101 may also include a main processor and a co-processor. The main processor is a processor configured to process data in a wake-up state or is referred to as a central processing unit (CPU). The co-processor is a low power consumption processor configured to process data in a standby state. In some embodiments, the processor 2101 may be integrated with a graphics processing unit (GPU). The GPU is configured to render and draw content that needs to be displayed on a display. In some embodiments, the processor 2101 may further include an artificial intelligence (AI) processor. The AI processor is configured to process a computing operation related to machine learning.

The memory 2102 may include one or more computer-readable storage media. The computer-readable storage medium may be non-transient. The memory 2102 may further include a high-speed random access memory (RAM) and a non-volatile memory such as one or more magnetic disk storage devices or flash memory storage devices. In some embodiments, the non-transient computer-readable storage medium in the memory 2102 is configured to store at least one instruction. The at least one instruction is executed by the processor 2101 to implement the repositioning method in a camera pose tracking process provided in the method embodiments of this application.

In some embodiments, the electronic device 2100 further optionally includes a peripheral interface 2103 and at least one peripheral. The processor 2101, the memory 2102, and the peripheral interface 2103 may be connected by a bus or a signal line. Peripherals may be connected to the peripheral interface 2103 by a bus, a signal line or a circuit board. Schematically, the peripheral includes at least one of a radio frequency (RF) circuit 2104, a touch display 2105, a camera component 2106, an audio circuit 2107, a positioning component 2108, and a power supply 2109.

The peripheral interface 2103 may be configured to connect at least one peripheral related to an input/output (I/O) to the processor 2101 and the memory 2102. In some embodiments, the processor 2101, the memory 2102, and the peripheral interface 2103 are integrated in one same chip or circuit board. In some other embodiments, any one or two of the processor 2101, the memory 2102, and the peripheral interface 2103 may be separately implemented on a chip or circuit board. This is not limited in this embodiment.

The RF circuit 2104 is configured to receive and transmit an RF signal, which is also referred to as electromagnetic signal. The RF circuit 2104 communicates with a communications network and another communication device by using an electromagnetic signal. The RF circuit 2104 converts an electrical signal into an electromagnetic signal for transmission, or, converts a received electromagnetic signal into an electrical signal. Optionally. The RF circuit 2104 includes an antenna system, an RF transceiver, one or more amplifiers, a tuner, an oscillator, a DSP, a CODEC chip set, a subscriber identity module card, and the like. The RF circuit 2104 may communicate with another electronic device by using at least one wireless communication protocol. The wireless communication protocol includes, but is not limited to, a World Wide Web, a metropolitan area network, an intranet, various generations of mobile communications networks (2G, 3G, 4G, and 5G), a wireless local area network and/or a Wireless Fidelity (Wi-Fi) network. In some embodiments. The RF circuit 2104 may further include a Near Field Communication (NFC)-related circuit. This is not limited in this application.

The display 2105 is configured to display a user interface (UI). The UI may include a graphic, a text, an icon, a video, and any combination thereof. In a case that the display 2105 is a touch display, the display 2105 further has a capability of acquiring a touch signal on or above the surface of the display 2105. The touch signal may be input as a control signal into the processor 2101 for processing. In this case, the display 2105 may further be configured to provide a virtual button and/or a virtual keyboard, which is also referred to as a soft button and/or a soft keyboard. In some embodiments, there may be one display 2105, disposed on a front panel of the electronic device 2100. In some other embodiments, there may be at least two displays 2105, respectively disposed on different surfaces of the electronic device 2100 or designed to be foldable. In some other embodiments, the display 2105 may be a flexible display, disposed on a curved surface or folded surface of the electronic device 2100. Even, the display 2105 may further be disposed to be a non-rectangular irregular graphic, that is, an irregular-shaped screen. The display 2105 may be manufactured by using a material such as a liquid crystal display (LCD) or an organic light-emitting diode (OLED).

The camera component 2106 is configured to acquire an image or a video. Optionally, the camera component 2106 includes a front-facing camera and a rear-facing camera. Generally, the front-facing camera is disposed on the front panel of the electronic device, and the rear-facing camera is disposed on the back surface of the electronic device. In some embodiments, there are at least two rear-facing cameras, which are respectively any one of a main camera, a depth-of-field camera, a wide-angle camera, a long-focus camera, to implement the integration of the main camera and the depth-of-field camera to implement a background blurring function, the integration of the main camera and the wide-angle camera to implement panoramic photography and a virtual reality (VR) photographing function or another integrated photographing function. In some embodiments, the camera component 2106 may further include a flash. The flash may be a mono color temperature flash or may be a dual color temperature flash. The dual color temperature flash is a combination of a warm light flash and a cold light flash and may be used for light compensation at different color temperatures.

The audio circuit 2107 may include a microphone and a loudspeaker. The microphone is configured to acquire sound waves from a user and an environment and convert the sound waves into electrical signals for input into the processor 2101 for processing or input into the RF circuit 2104 to implement voice communication. For stereo acquisition or noise reduction, there may be a plurality of microphones, respectively disposed at different positions of the electronic device 2100. The microphone may be alternatively a microphone array or an omnidirectional microphone. The loudspeaker is configured to convert an electrical signal from the processor 2101 or the RF circuit 2104 into a sound wave. The loudspeaker may be a conventional diaphragm loudspeaker or may be a piezoelectric ceramic loudspeaker. In a case that the loudspeaker is a piezoelectric ceramic loudspeaker, an electrical signal can be converted into a sound wave audible to humans, and an electrical signal can be converted into a sound wave inaudible to humans for uses such as ranging. In some embodiments, the audio circuit 2107 may further include an earphone jack.

The positioning component 2108 is configured to locate a current geographical position of the electronic device 2100, to implement navigation or a location-based service (LBS). The positioning component 2108 may be a positioning component based on the US' global positioning system (GPS), China's BeiDou system, Russia's GLONASS, and Europe's Galileo system.

The power supply 2109 is configured to supply power to various components in the electronic device 2100. The power supply 2109 may be alternating-current (AC) power, direct-current (AC) power, a disposable battery or a rechargeable battery. In a case that the power supply 2109 includes a rechargeable battery, the rechargeable battery may be a wired charging battery or a wireless charging battery. The wired charging battery is a battery charged by using a wired circuit, and the wireless charging battery is a battery charged by using a wireless coil. The rechargeable battery may be alternatively used to support a fast charging technology.

In some embodiments, the electronic device 2100 further includes one or more sensors 2110. The one or more sensors 2110 include, but are not limited to, an acceleration sensor 2111, a gyroscope sensor 2112, a pressure sensor 2113, a fingerprint sensor 2114, an optical sensor 2115, and a proximity sensor 2116.

The acceleration sensor 2111 may detect accelerations on three coordinate axes of a coordinate system established by the electronic device 2100. For example, the acceleration sensor 2111 may be configured to detect the components of the gravitational acceleration on the three coordinate axes. The processor 2101 may control the touch display 2105 according to a gravitational acceleration signal acquired by the acceleration sensor 2111 to display a user interface in a landscape view or a portrait view. The acceleration sensor 2111 may further be configured to acquire game data or movement data of a user.

The gyroscope sensor 2112 may detect a body direction and a rotational angle of the electronic device 2100, and the gyroscope sensor 2112 may coordinate with the acceleration sensor 2111 to acquire a 3D motion of a user on the electronic device 2100. The processor 2101 may implement the following functions according to data acquired by the gyroscope sensor 2112: motion sensing (for example, a UI is changed according to a tilt operation of a user), image stabilization during photographing, game control, and inertial navigation.

The pressure sensor 2113 may be disposed at a side frame of the electronic device 2100 and/or at an underlying layer of the touch display 2105. In a case that the pressure sensor 2113 is disposed at a side frame of the electronic device 2100, a holding signal of the electronic device 2100 by a user may be detected, and the processor 2101 performs left/right hand recognition or fast operation according to the holding signal acquired by the pressure sensor 2113. In a case that the pressure sensor 2113 is disposed at an underlying layer of the touch display 2105, and the processor 2101 controls an operable control on the UI according to a pressure operation on the touch display 2105 by the user. The operable control includes at least one of a button control, a scroll bar control, an icon control, and a menu control.

The fingerprint sensor 2114 is configured to acquire a fingerprint of a user, and the processor 2101 recognizes the identity of the user according to the fingerprint acquired by the fingerprint sensor 2114, or, the fingerprint sensor 2114 recognizes the identity of the user according to the acquired fingerprint. In a case that it is recognized that the identity of the user is a trusted identity, the processor 2101 authorizes the user to perform a related sensitive operation. The sensitive operation includes unlocking a screen, viewing encrypted information, downloading software, making a payment, changing a setting, and the like. The fingerprint sensor 2114 may be disposed on a front surface, a rear surface or a side surface of the electronic device 2100. In a case that the electronic device 2100 is provided with a physical button or a manufacturer logo, the fingerprint sensor 2114 may be integrated with the physical button or manufacturer logo.

The optical sensor 2115 is configured to acquire environmental light intensity. In an embodiment, the processor 2101 may control the display brightness of the touch display 2105 according to the environmental light intensity acquired by the optical sensor 2115. Schematically, the display brightness of the touch display 2105 is increased in a case that the environmental light intensity is relatively high. The display brightness of the touch display 2105 is reduced in a case that environmental light intensity is relatively low. In another embodiment, the processor 2101 may further dynamically adjust a photographing parameter of the camera component 2106 according to the environmental light intensity acquired by the optical sensor 2115.

The proximity sensor 2116 is also referred to as a distance sensor and is usually disposed on the front panel of the electronic device 2100. The proximity sensor 2116 is configured to acquire a distance between a user and the front surface of the electronic device 2100. In an embodiment, in a case that the proximity sensor 2116 detects that the distance between the user and the front surface of the electronic device 2100 gradually decreases, the processor 2101 controls the touch display 2105 to switch from a screen-on state to a screen-off state. In a case that the proximity sensor 2116 detects that the distance between the user and the front surface of the electronic device 2100 gradually increases, the processor 2101 controls the touch display 2105 to switch from the screen-off state to the screen-on state.

A person skilled in the art may understand that, the structure shown in FIG. 21 does not constitute a limitation to the electronic device 2100. More or fewer components than those shown in the figure may be included, or some component may be combined, or different component arrangements may be used.

This application further provides a computer-readable storage medium, the storage medium storing at least one instruction, at least one program, and a code set or an instruction set, and the at least one instruction, the at least one program, and the code set or the instruction set being loaded and executed by a processor to implement the repositioning method in a camera pose tracking process provided in the foregoing method embodiments.

This application further provides a computer program product, the computer program product, when run on an electronic device, causing the electronic device to perform the repositioning method in a camera pose tracking process in the foregoing method embodiments.

The sequence numbers of the foregoing embodiments of this application are merely for description purpose and do not indicate the preference of the embodiments.

A person of ordinary skill in the art may understand that all or some of the steps of the foregoing embodiments may be implemented by using hardware, or may be implemented by a program instructing relevant hardware. The program may be stored in a computer-readable storage medium. The storage medium may be a read-only memory (ROM), a magnetic disk, an optical disc, or the like.

The foregoing descriptions are merely preferred embodiments of this application, but are not intended to limit this application. Any modification, equivalent replacement, or improvement made within the spirit and principle of this application shall fall within the protection scope of this application.

What is claimed is:

1. A repositioning method in a camera pose tracking process, applied to an electronic device having a camera, the electronic device being configured to sequentially perform camera pose tracking on a plurality of anchor images, the method comprising:
    obtaining a current image acquired by the camera after an $i^{th}$ anchor image in the plurality of anchor images, i being greater than 1;
    obtaining an initial feature point and an initial pose parameter in a first anchor image in the plurality of anchor images in a case that the current image satisfies a repositioning condition;
    performing feature point tracking on the current image relative to the initial feature point in the first anchor image, to obtain a plurality of matching feature point pairs;
    filtering the plurality of matching feature point pairs according to a constraint condition, to obtain a filtered matching feature point pair;
    calculating a pose change amount of the camera from the initial pose parameter to a target pose parameter according to the filtered matching feature point pair; and
    performing repositioning according to the initial pose parameter and the pose change amount to obtain the target pose parameter of the camera.

2. The method according to claim 1, wherein the constraint condition comprises at least one of the following conditions:
    a target feature point is a feature point that uniquely matches the initial feature point;
    the initial feature point and a target feature point satisfy an Epipolar constraint; or
    a target feature point is a feature point with the highest matching degree in a raster area, and the raster area is an area obtained after the current image is rasterized.

3. The method according to claim 2, wherein the constraint condition comprises that a target feature point is a feature point that uniquely matches the initial feature point; and
    the filtering the plurality of matching feature point pairs according to a constraint condition, to obtain a filtered matching feature point pair comprises:
    for an initial feature point in any matching feature point pair, obtaining a target feature point and a secondary feature point that match the initial feature point, the target feature point being a feature point with a matching degree ranking first in a plurality of candidate feature points matching the initial feature point, and the secondary feature point being a feature point with a matching degree ranking second in the plurality of candidate feature points matching the initial feature point; and
    determine that the target feature point is the filtered target feature point in a case that the difference between the matching degree ranking first and the matching degree ranking second is greater than a preset threshold.

4. The method according to claim 2, wherein the constraint condition comprises that the initial feature point and a target feature point satisfy an Epipolar constraint; or
    the filtering the plurality of matching feature point pairs according to a constraint condition, to obtain a filtered matching feature point pair comprises:
    for any matching feature point pair, calculating a product of multiplying two-dimensional coordinates of the initial feature point, a basis matrix, and two-dimensional coordinates of the target feature point, the basis matrix being used to fit an Epipolar constraint condition between the first anchor image and the current image; and determining that the matching feature point pair is the filtered matching feature point pair in a case that the product is less than an error threshold.

5. The method according to claim 2, wherein the constraint condition comprises that a target feature point is a feature point with the highest matching degree in a raster area; and the filtering the plurality of matching feature point pairs according to a constraint condition, to obtain a filtered matching feature point pair comprises:

performing rasterization processing on the current image, to obtain a plurality of raster areas;

for any raster area with a target feature point in the plurality of raster areas, choosing through filtering a target feature point having the highest matching degree in the raster area; and determining the matching feature point pair corresponding to the target feature point having the highest matching degree as the filtered matching feature point pair.

6. The method according to claim 1, wherein the performing feature point tracking on the current image relative to the initial feature point in the first anchor image, to obtain a plurality of matching feature point pairs comprises:

clustering the initial feature point into a first node tree by using a bag-of-words (BoW) model, each parent node of the first node tree comprising K child nodes, and each node comprising initial feature points clustered into one same type;

extracting candidate feature points from the current image, and clustering the candidate feature points into a second node tree by using a BoW model, each parent node in the second node tree comprising K child nodes, and each node comprising candidate feature points clustered into one same type; and performing feature point tracking on an ith first node in a forward index in the first node tree, and an ith second node in a forward index in the second node tree, to obtain the plurality of matching feature point pairs.

7. The method according to claim 6, wherein the $i^{th}$ first node is an intermediate node in the first node tree, the $i^{th}$ second node is an intermediate node in the second node tree, and the intermediate node is a node located between a root node and a leaf node.

8. The method according to claim 1, wherein the performing repositioning according to the initial pose parameter and the pose change amount to obtain the target pose parameter of the camera comprises:

calculating a homography matrix of the camera in a camera pose change process according to the plurality of filtered matching feature point pairs; and decomposing the homography matrix, to obtain the pose change amount comprising $R_{reposition}$ and $T_{reposition}$ of the change of the camera from the initial pose parameter to the target pose parameter.

9. The method according to claim 8, wherein after the calculating a homography matrix of the camera in a camera pose change process according to the plurality of filtered matching feature point pairs, the method further comprises:

calculating a projected feature point of the initial feature point in the current image by using the homography matrix;

calculating a projection error between the projected feature point and the target feature point;

performing the operation of decomposing the homography matrix, to obtain the pose change amount comprising $R_{reposition}$ and $T_{reposition}$ of the change of the camera from the initial pose parameter to the target pose parameter in a case that the projection error is less than the preset threshold.

10. An electronic device, comprising a memory and a processor, a camera, and a plurality of programs stored in the memory, wherein the plurality of programs, when executed by the processor, cause the electronic device to sequentially perform a process of camera pose tracking on a plurality of anchor images, the process including:

obtaining a current image acquired by the camera after an $i^{th}$ anchor image in the plurality of anchor images, i being greater than 1;

obtaining an initial feature point and an initial pose parameter in a first anchor image in the plurality of anchor images in a case that the current image satisfies a repositioning condition;

performing feature point tracking on the current image relative to the initial feature point in the first anchor image, to obtain a plurality of matching feature point pairs;

filtering the plurality of matching feature point pairs according to a constraint condition, to obtain a filtered matching feature point pair;

calculating a pose change amount of the camera from the initial pose parameter to a target pose parameter according to the filtered matching feature point pair; and performing repositioning according to the initial pose parameter and the pose change amount to obtain the target pose parameter of the camera.

11. The electronic device according to claim 10, wherein the constraint condition comprises at least one of the following conditions:

a target feature point is a feature point that uniquely matches the initial feature point;

the initial feature point and a target feature point satisfy an Epipolar constraint; or a target feature point is a feature point with the highest matching degree in a raster area, and the raster area is an area obtained after the current image is rasterized.

12. The electronic device according to claim 11, wherein the constraint condition comprises that a target feature point is a feature point that uniquely matches the initial feature point; and the filtering the plurality of matching feature point pairs according to a constraint condition, to obtain a filtered matching feature point pair comprises:

for an initial feature point in any matching feature point pair, obtaining a target feature point and a secondary feature point that match the initial feature point, the target feature point being a feature point with a matching degree ranking first in a plurality of candidate feature points matching the initial feature point, and the secondary feature point being a feature point with a matching degree ranking second in the plurality of candidate feature points matching the initial feature point; and determine that the target feature point is the filtered target feature point in a case that the difference between the matching degree ranking first and the matching degree ranking second is greater than a preset threshold.

13. The electronic device according to claim 11, wherein the constraint condition comprises that the initial feature point and a target feature point satisfy an Epipolar constraint; or the filtering the plurality of matching feature point pairs according to a constraint condition, to obtain a filtered matching feature point pair comprises:

for any matching feature point pair, calculating a product of multiplying two-dimensional coordinates of the initial feature point, a basis matrix, and two-dimensional coordinates of the target feature point, the basis matrix being used to fit an Epipolar constraint condition between the first anchor image and the current image; and determining that the matching feature point pair is the filtered matching feature point pair in a case that the product is less than an error threshold.

14. The electronic device according to claim 11, wherein the constraint condition comprises that a target feature point is a feature point with the highest matching degree in a raster area; and the filtering the plurality of matching feature point pairs according to a constraint condition, to obtain a filtered matching feature point pair comprises:

performing rasterization processing on the current image, to obtain a plurality of raster areas;

for any raster area with a target feature point in the plurality of raster areas, choosing through filtering a target feature point having the highest matching degree in the raster area; and determining the matching feature point pair corresponding to the target feature point having the highest matching degree as the filtered matching feature point pair.

15. The electronic device according to claim 10, wherein the performing feature point tracking on the current image relative to the initial feature point in the first anchor image, to obtain a plurality of matching feature point pairs comprises:

clustering the initial feature point into a first node tree by using a bag-of-words (BoW) model, each parent node of the first node tree comprising K child nodes, and each node comprising initial feature points clustered into one same type;

extracting candidate feature points from the current image, and clustering the candidate feature points into a second node tree by using a BoW model, each parent node in the second node tree comprising K child nodes, and each node comprising candidate feature points clustered into one same type; and performing feature point tracking on an ith first node in a forward index in the first node tree, and an ith second node in a forward index in the second node tree, to obtain the plurality of matching feature point pairs.

16. The electronic device according to claim 15, wherein the $i^{th}$ first node is an intermediate node in the first node tree, the $i^{th}$ second node is an intermediate node in the second node tree, and the intermediate node is a node located between a root node and a leaf node.

17. The electronic device according to claim 10, wherein the performing repositioning according to the initial pose parameter and the pose change amount to obtain the target pose parameter of the camera comprises:

calculating a homography matrix of the camera in a camera pose change process according to the plurality of filtered matching feature point pairs; and decomposing the homography matrix, to obtain the pose change amount comprising $R_{reposition}$ and $T_{reposition}$ of the change of the camera from the initial pose parameter to the target pose parameter.

18. The electronic device according to claim 17, wherein the process further comprises:

after calculating the homography matrix of the camera in a camera pose change process according to the plurality of filtered matching feature point pairs:

calculating a projected feature point of the initial feature point in the current image by using the homography matrix;

calculating a projection error between the projected feature point and the target feature point;

performing the operation of decomposing the homography matrix, to obtain the pose change amount comprising $R_{reposition}$ and $T_{reposition}$ of the change of the camera from the initial pose parameter to the target pose parameter in a case that the projection error is less than the preset threshold.

19. A non-transitory computer-readable storage medium storing instructions, the instructions, when executed by a processor of an electronic device having a camera, cause the electronic device to sequentially perform a process of camera pose tracking on a plurality of anchor images, the process including:

obtaining a current image acquired by the camera after an $i^{th}$ anchor image in the plurality of anchor images, i being greater than 1;

obtaining an initial feature point and an initial pose parameter in a first anchor image in the plurality of anchor images in a case that the current image satisfies a repositioning condition;

performing feature point tracking on the current image relative to the initial feature point in the first anchor image, to obtain a plurality of matching feature point pairs;

filtering the plurality of matching feature point pairs according to a constraint condition, to obtain a filtered matching feature point pair;

calculating a pose change amount of the camera from the initial pose parameter to a target pose parameter according to the filtered matching feature point pair; and performing repositioning according to the initial pose parameter and the pose change amount to obtain the target pose parameter of the camera.

20. The non-transitory computer-readable storage medium according to claim 19, wherein the constraint condition comprises at least one of the following conditions:

a target feature point is a feature point that uniquely matches the initial feature point;

the initial feature point and a target feature point satisfy an Epipolar constraint; or a target feature point is a feature point with the highest matching degree in a raster area, and the raster area is an area obtained after the current image is rasterized.

* * * * *